(12) United States Patent
Isgar

(10) Patent No.: US 12,407,902 B2
(45) Date of Patent: Sep. 2, 2025

(54) SOCIAL MEDIA TICKER SYSTEM WITH AI INTEGRATION

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

(21) Appl. No.: 18/051,588

(22) Filed: Nov. 1, 2022

(65) Prior Publication Data

US 2023/0135160 A1  May 4, 2023

Related U.S. Application Data

(60) Provisional application No. 63/274,161, filed on Nov. 1, 2021.

(51) Int. Cl.
*H04N 21/4788* (2011.01)
*G06Q 50/00* (2012.01)
*H04N 21/475* (2011.01)
*H04N 21/488* (2011.01)

(52) U.S. Cl.
CPC ......... *H04N 21/4788* (2013.01); *G06Q 50/01* (2013.01); *H04N 21/4758* (2013.01); *H04N 21/4886* (2013.01)

(58) Field of Classification Search
CPC ........... H04N 21/4788; H04N 21/4758; H04N 21/4886; G06Q 50/01
See application file for complete search history.

(56) References Cited

U.S. PATENT DOCUMENTS

| | | | |
|---|---|---|---|
| 2010/0121849 A1* | 5/2010 | Goeldi | G06Q 30/00 707/E17.108 |
| 2015/0378587 A1* | 12/2015 | Falaki | G06F 3/0488 715/747 |
| 2016/0080817 A1* | 3/2016 | Chai | G06F 3/0482 725/43 |
| 2018/0124438 A1* | 5/2018 | Barnett | H04N 21/4826 |
| 2018/0285910 A1* | 10/2018 | De Kleijn | G07F 17/3274 |
| 2020/0234544 A1 | 7/2020 | Joao | |
| 2020/0294354 A1 | 9/2020 | Joao | |
| 2021/0118265 A1 | 4/2021 | Joao | |
| 2021/0264735 A1 | 8/2021 | Joao | |
| 2023/0024852 A1 | 1/2023 | Joao | |
| 2024/0087425 A1 | 3/2024 | Darby | |
| 2024/0386783 A1 | 11/2024 | Joao | |

* cited by examiner

*Primary Examiner* — Joshua D Taylor
(74) *Attorney, Agent, or Firm* — Schmeiser, Olsen & Watts LLP

(57) ABSTRACT

Described is a social media ticker system. The system may include a social media server having a memory storing various data, a first user computing device coupled to the server and a first TV and a second user computing device coupled to the server and a second TV. The first and second TVs are configured to display a ticker displaying interaction between the first and second user computing devices on a social media platform engaged with a social media server while watching the same particular program on the first and second TVs respectively. Further, the server may be programmed to send a poll request corresponding to what is displayed on the first and second TVs for input from the first and second user computing devices, wherein input responsive to the poll request is anonymous and is collected and aggregated on the social media server.

5 Claims, 27 Drawing Sheets

SOCIAL MEDIA TICKER SYSTEM WITH AI INTEGRATION

CROSS REFERENCE TO RELATED APPLICATION[S]

This application claims priority to U.S. Provisional Patent Application entitled "SOCIAL MEDIA TICKER SYSTEM," Ser. No. 63/274,161, filed Nov. 1, 2021, the disclosure of which is hereby incorporated entirely herein by reference.

BACKGROUND OF THE INVENTION

Technical Field

This invention generally relates to social media systems, and more particularly to a system for interaction on social media that includes overlaying a TV program with a ticker showing social media interaction with others on the ticker.

State of the Art

There is increasing amounts interaction of individuals on social media platforms and in some instances is the only manner of communication between individuals. People engage in social media interactions for not only communication, but also for entertainment and the like. This can happen over phones engaging in social media posts and interaction regarding the same and can happen during and in reference to programming broadcast over the television or streamed over the television through streaming TV and movie services. There lacks a system that allows for individuals to engage in social media interaction that is also displayed on the TV screen as a ticker overlayed on the program being displayed and watched by individuals as a ticker on the screen that displays the interactions as individuals post on the social media platform. Additionally, there is lacking a system like this that can also collect and aggregate data and input from the individuals engaged in such a system.

Accordingly, what is needed is a system for social media ticker system that overlays a ticker displaying social media interaction over a program being displayed on a TV.

SUMMARY OF THE INVENTION

An embodiment includes a system for social interaction regarding features based on geolocation, the system comprising: a social media server having a memory storing various data; a first user computing device coupled to the server and a first TV; and a second user computing device coupled to the server and a second TV, wherein the first and second TVs are configured to display a ticker displaying interaction between the first and second user computing devices on a social media platform engaged with a social media server while watching the same particular program on the first and second TVs respectively. The server may also be programmed to send a poll request corresponding to what is displayed on the first and second TVs for input from the first and second user computing devices, wherein input responsive to the poll request is anonymous and is collected and aggregated on the social media server.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a social media ticker system that operates to allow individuals to engage in social media interaction that also overlays the interaction on a TV program displayed on a TV for viewing of the interaction by all watching the program. The system may include the use of a mobile application operating on a user computing device that may be a mobile computing device like a smartphone, a tablet, a wearable, and the like.

Figure 1A:
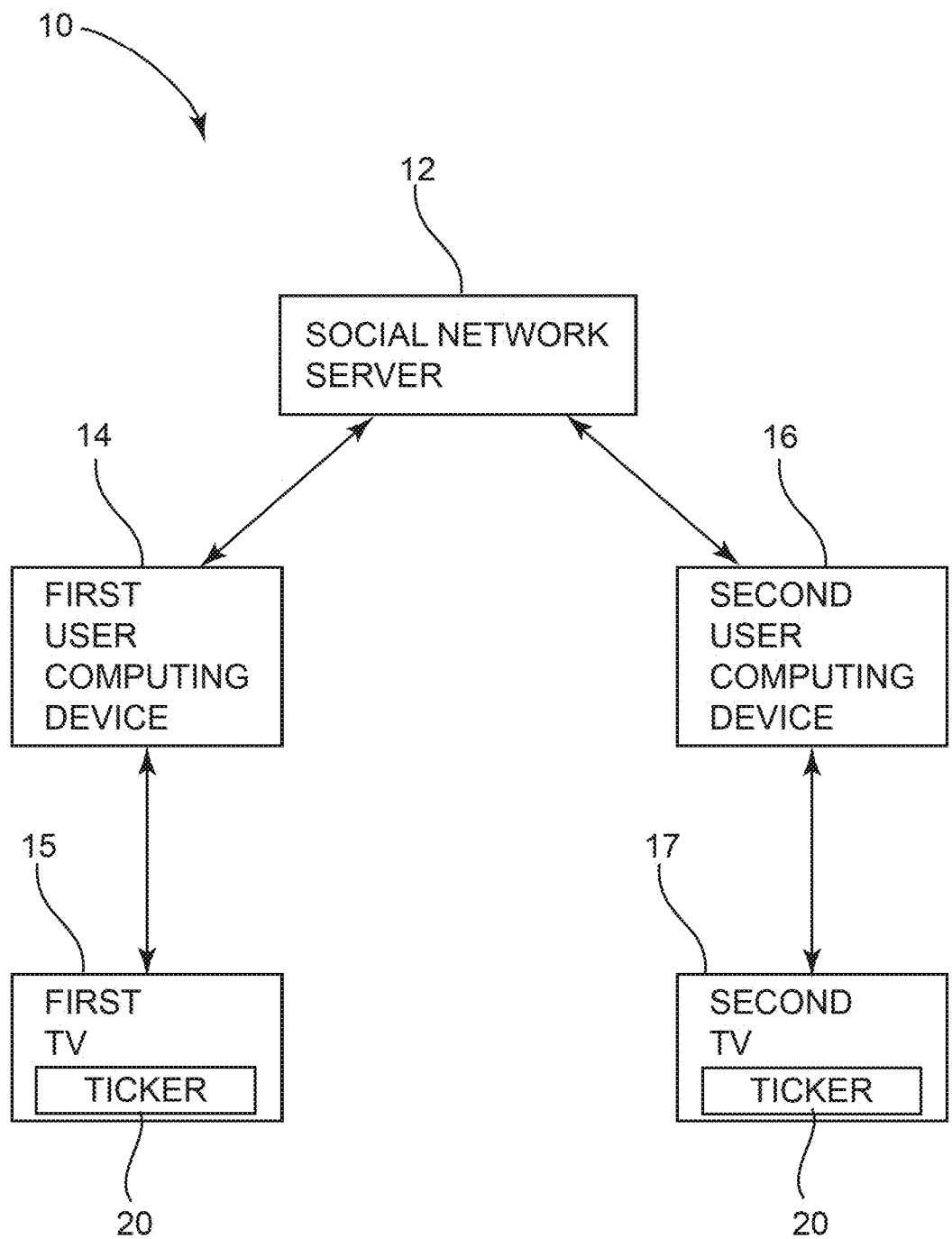
FIG. 1A is a diagrammatic view of a social media ticker system according to an embodiment.

FIGS. 1A-2, and 5 show two embodiments of a social media ticker system 10 for. FIG. 1A depicts an embodiment of a system 10 that may include a social media server 12 coupled to a first user computing device 14 that is coupled to a first TV 15 and the social media server is also connected to a second user computing device 16 that is coupled to a second TV 17. This coupling of the first user computing device 14 and the second user computing device 16 with the server 12 may be a network connection, such as a wireless connection through an Internet connection, a Wi-Fi connection, a Bluetooth connection or the like, wherein the user computing devices 14 and 16 may communicate with and receive communication from the server 12. This coupling of the first user computing device 14 and first TV 15 and further the coupling of the second user computing device 16 and the second TV 17 may be a network connection, such as a wireless connection through an Internet connection, a Wi-Fi connection, a Bluetooth connection or the like to send and received communication from each other. The user computing devices 14 and 16 may include a desktop computer, a laptop, a tablet, a smartphone, wearable devices a vehicle-installed computing device and the like. The server 12, in some embodiments, may be a computer server or a cloud-based infrastructure architecture. The first TV 15 and the second TV 17 may overlay a ticker 20 over the program being watched, such as a sporting event (see FIG. 2) a debate (see FIG. 5) or any type of program wherein the ticker 20 displays interactions of the first user computing device 14 and the second user computing device 16 on the respective TVs 15 and 17.

Figure 1B:
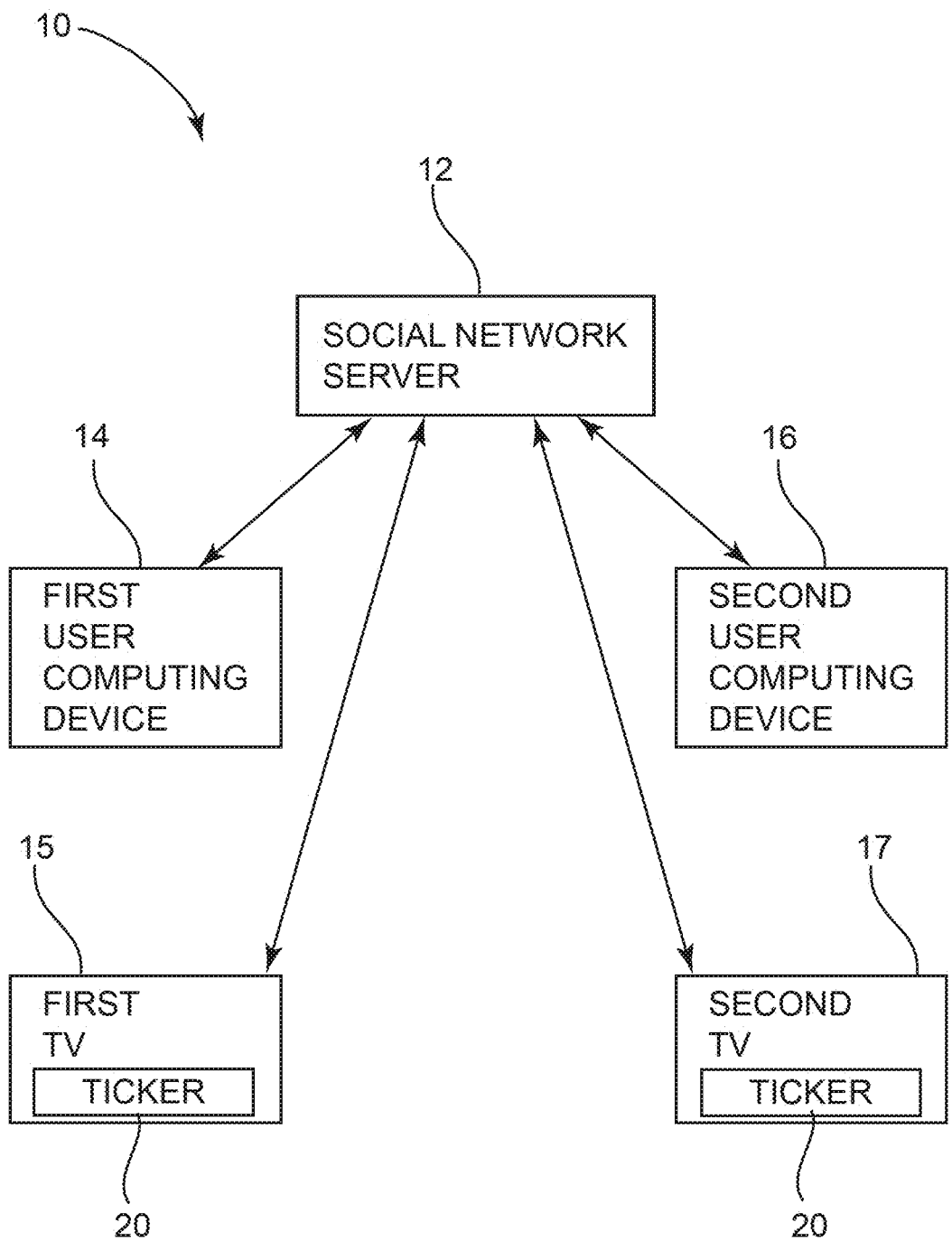
FIG. 1B is a diagrammatic view of another social media ticker system according to an embodiment.
Figure 2:
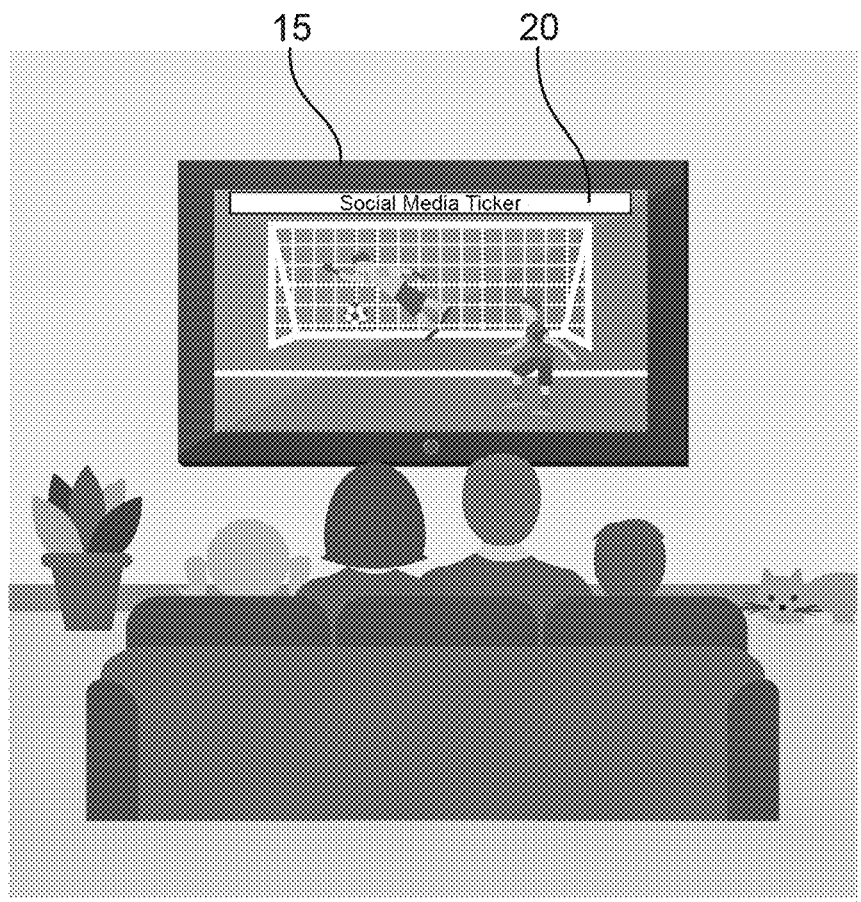
FIG. 2 depicts two TVs in different locations operating as part of a social media ticker system according to an embodiment.
Figure 2:
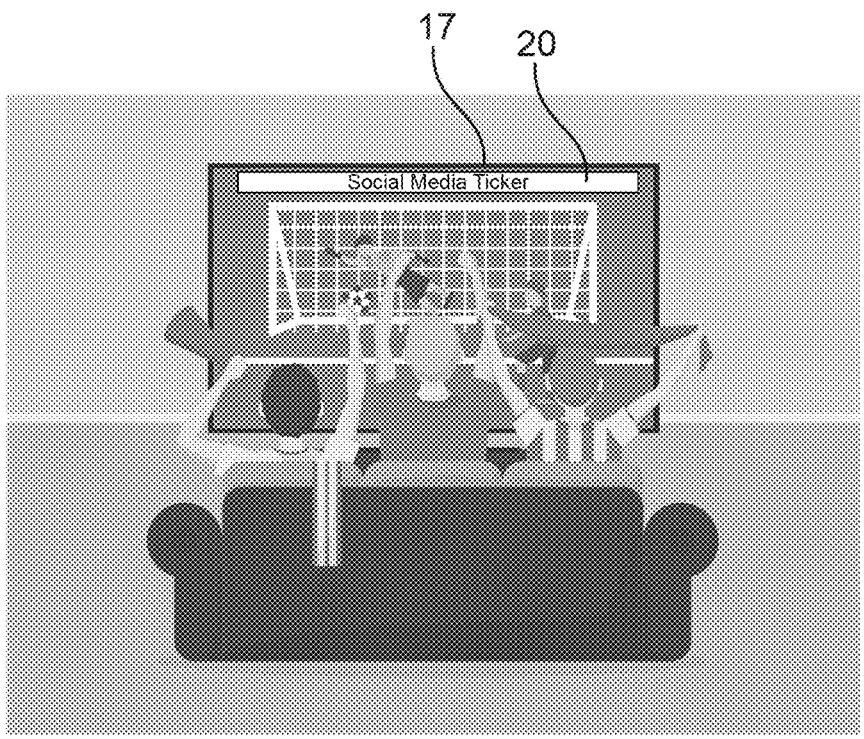

FIG. 1B depicts an embodiment of a system 10 that may include a social media server 12 coupled to a first user computing device 14 and coupled to a first TV 15 and the social media server 12 is also connected to a second user computing device 16 and coupled to a second TV 17. This coupling of the first user computing device 14, second user computing device 16, first TV 15 and second TV 17 with the server 12 may be a network connection, such as a wireless connection through an Internet connection, a Wi-Fi connection, a Bluetooth connection or the like, wherein the user computing devices 14 and 16 may communicate with and receive communication from the server 12. The user computing devices 14 and 16 may include a desktop computer, a laptop, a tablet, a smartphone, wearable devices a vehicle-installed computing device and the like. The server 12, in some embodiments, may be a computer server or a cloud-based infrastructure architecture. The first TV 15 and the second TV 17 may overlay a ticker 20 over the program being watched, wherein the ticker 20 displays interactions of the first user computing device 14 and the second user computing device 16 on the respective TVs 15 and 17.

The server 12 may include a memory storing various data. The memory of the server 12 may store posts made by users of the system in a manner similar to how the social media platform would typically store posts, or in other words, the server 14 stores social media posts. Additionally, the server 12 may store anonymous poll data wherein the system 10 operates to send a poll question to users of the system and anonymously gathers the poll data for utilization by the system 10 or for providing to third-parties the collected and aggregated anonymous poll data.

Figure 3A:
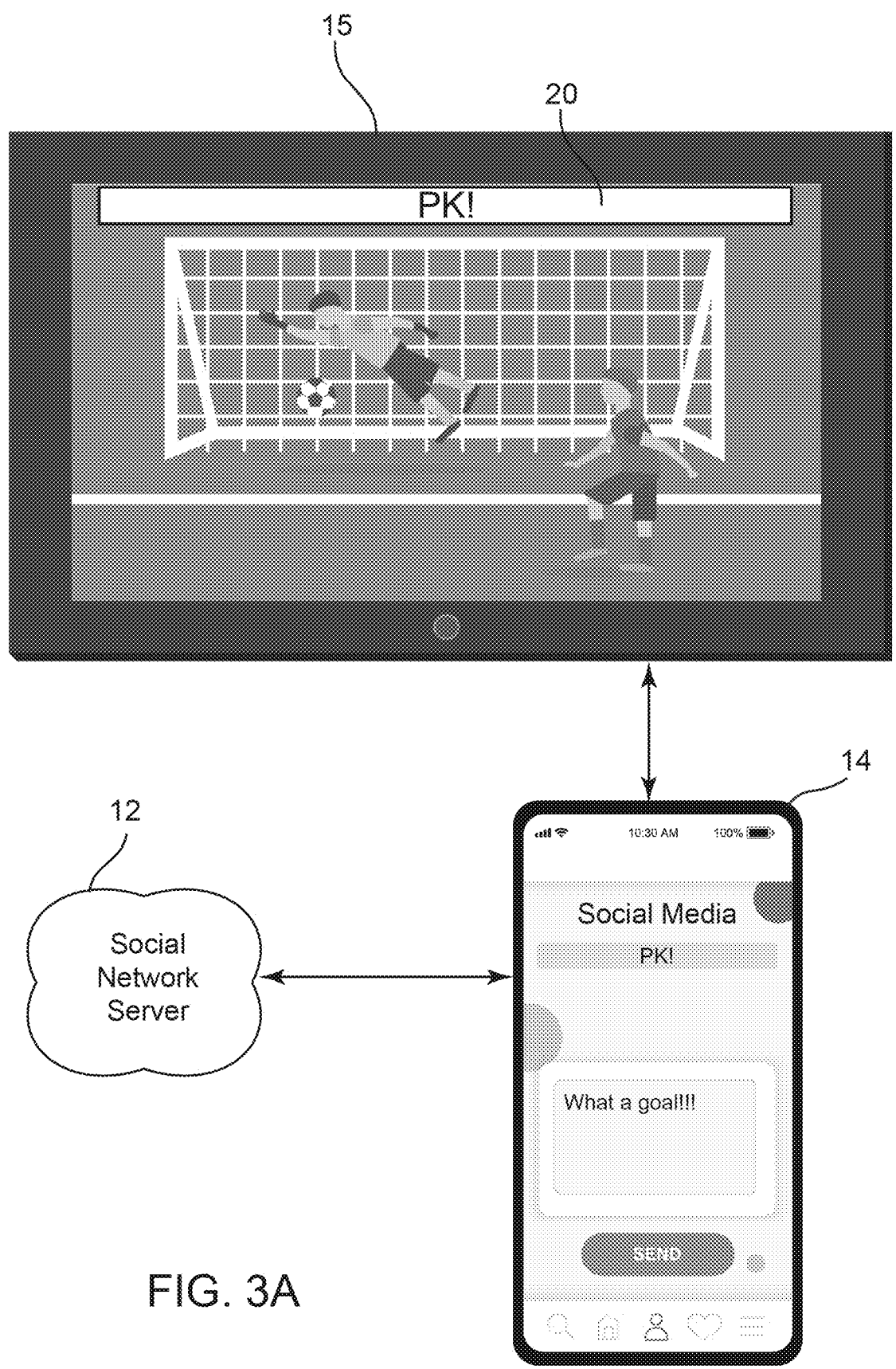
FIG. 3A is a view of a first user computing device and a first TV operating under the social media ticker system displayed in FIG. 1A according to an embodiment.
Figure 3B:
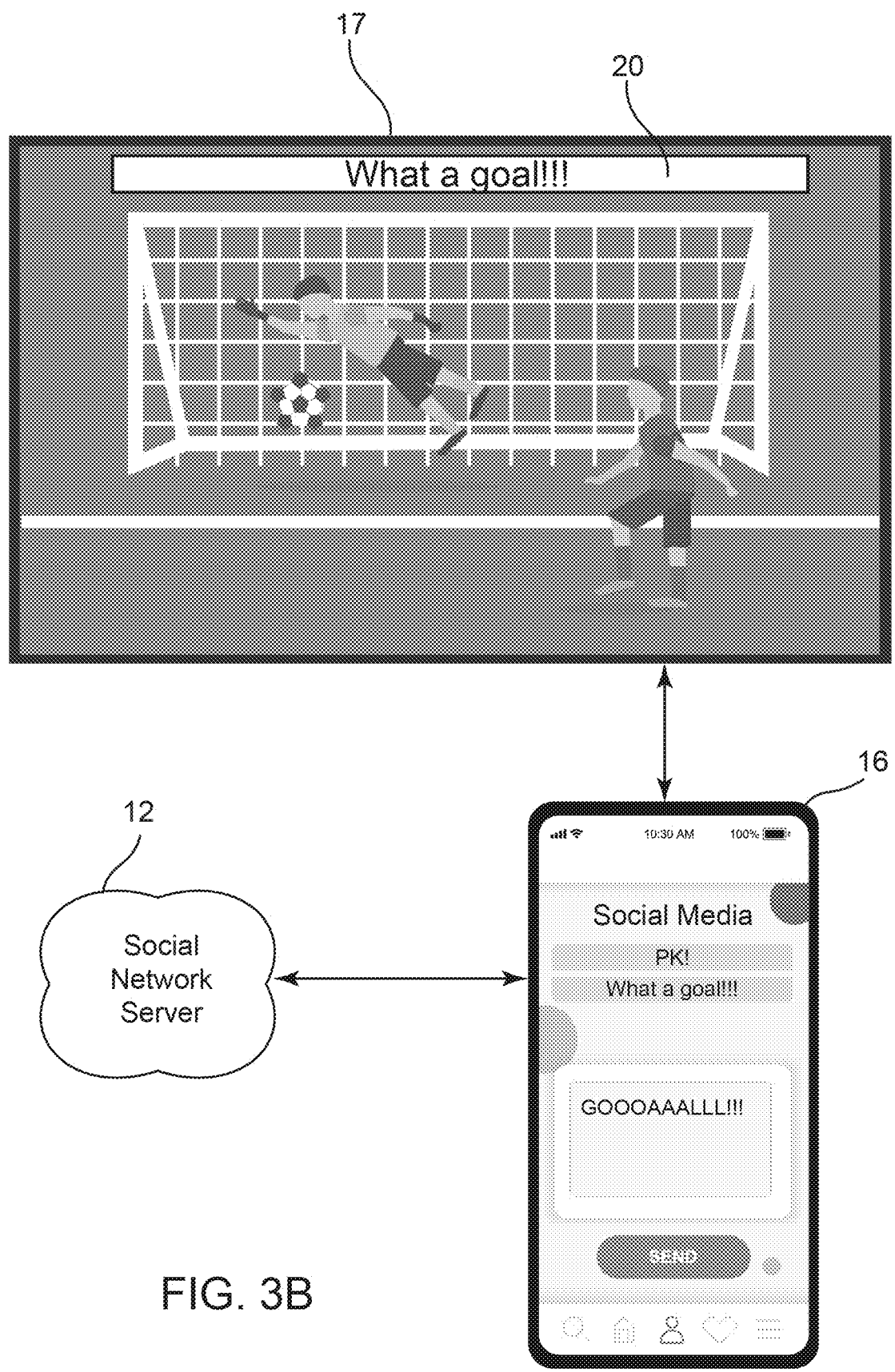
FIG. 3B is a view of a second user computing device and a second TV operating under the social media ticker system displayed in FIG. 1A according to an embodiment.
Figure 3C:
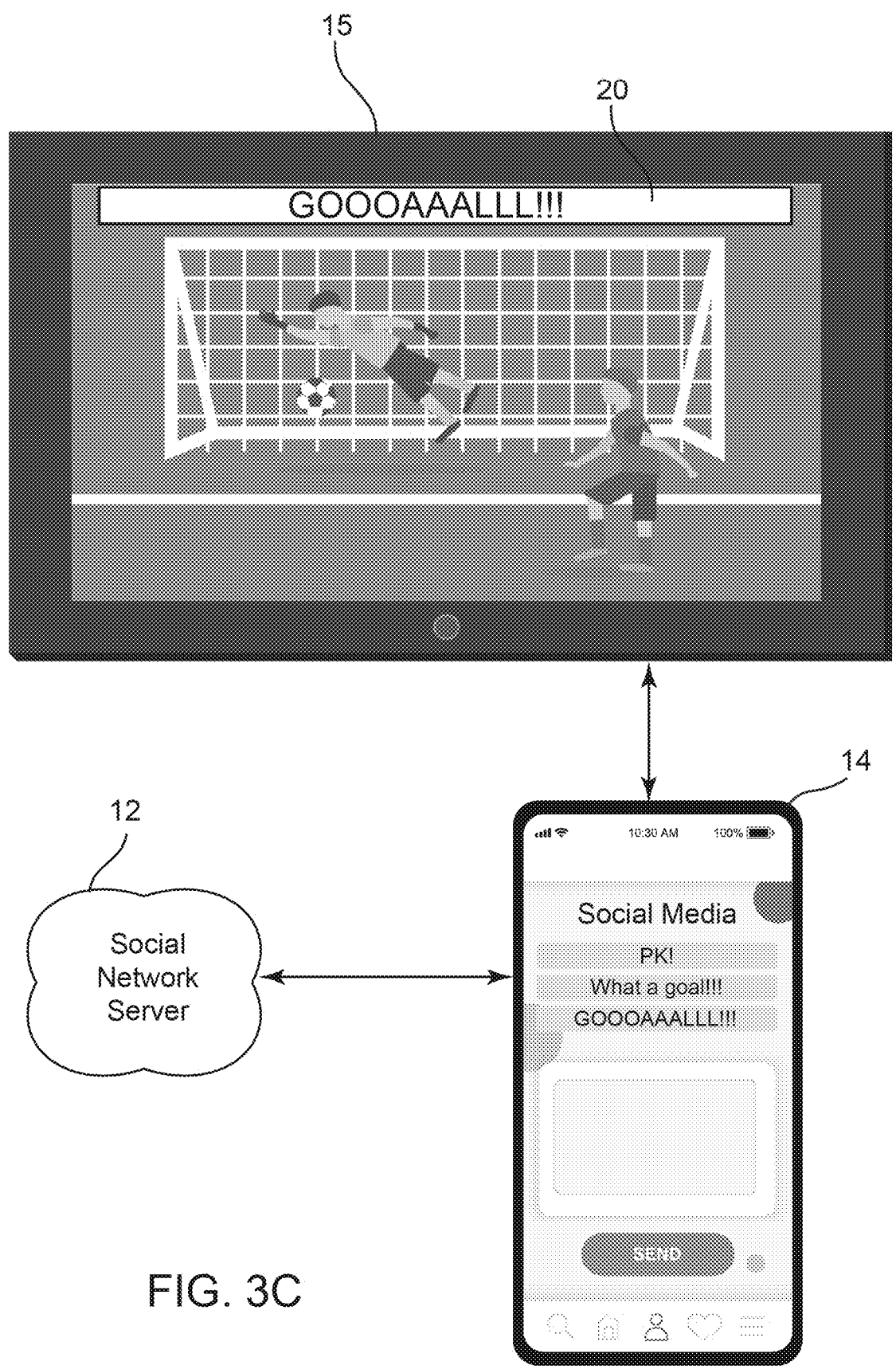
FIG. 3C is a view of a first user computing device and a first TV operating under the social media ticker system displayed in FIG. 1A according to an embodiment.

Referring to FIGS. 3A-3C, the system as depicted in FIG. 1A may be employed. This embodiment depicts users that are watching a sports program, such as a soccer match. It will be understood that this can be any programming and the system 10 operates wherein the users are engaged in watching the same TV program, such as but not limited to a debate shown in FIGS. 5 and 6A-6C, a commercial shown in FIGS. 7A-7B or the like. In embodiments, the interaction of the users are a group of users that have a connection of some kind, like friends, followers and the so forth that are set to watch the same program at the same time. FIG. 3A depicts a first user computing device 14 and a first TV 16 displaying a ticker 20, wherein the first user computing device 14 is watching programming and sees the last post made in ticker 14 and is entering a post on the first user computing device 14. After the first user computing device 14 sends the post, it is displayed on the ticker 20 on all TVs of those engaged and grouped together using the system, such as, but not limited to the second TV 17 coupled to the second user computing device 16, as shown in FIG. 3B, the second user may then post a message using the second user computing device 16 that is then displayed on all TVs of those engaged and grouped together using the system, such as, but not limited to the first TV 15 coupled to the first user computing device 14, as shown in FIG. 3C. It will be understood that the posts may be displayed on the user computing devices and the TV. Further, in this embodiment, the posts are received by the user computing devices 14 and 16 and then sent from the user computing devices 14 and 16 to the TVs 15 and 17 respectively.

Figure 4A:
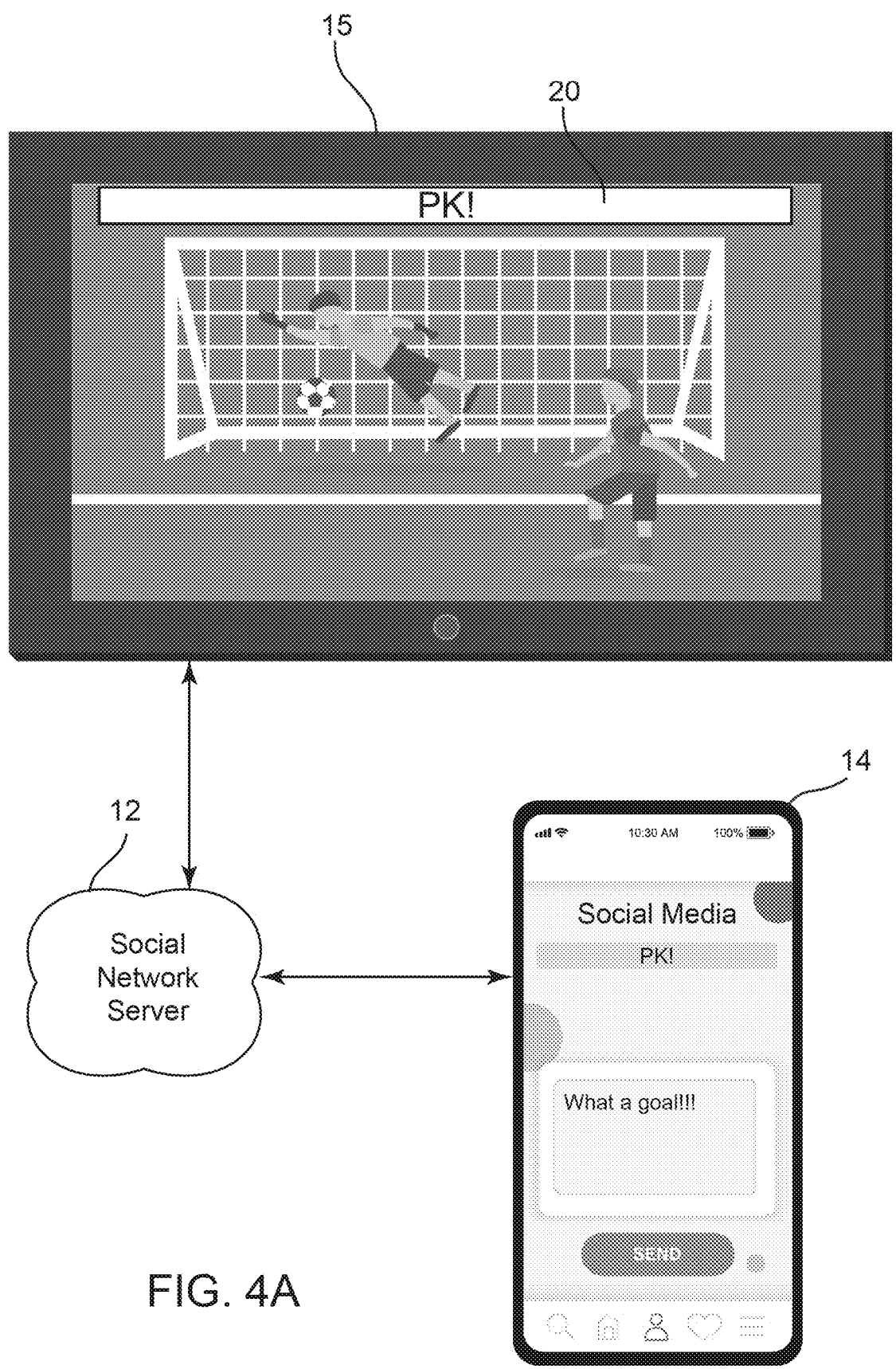
FIG. 4A is a view of a first user computing device and a first TV operating under the social media ticker system displayed in FIG. 1B according to an embodiment.
Figure 4B:
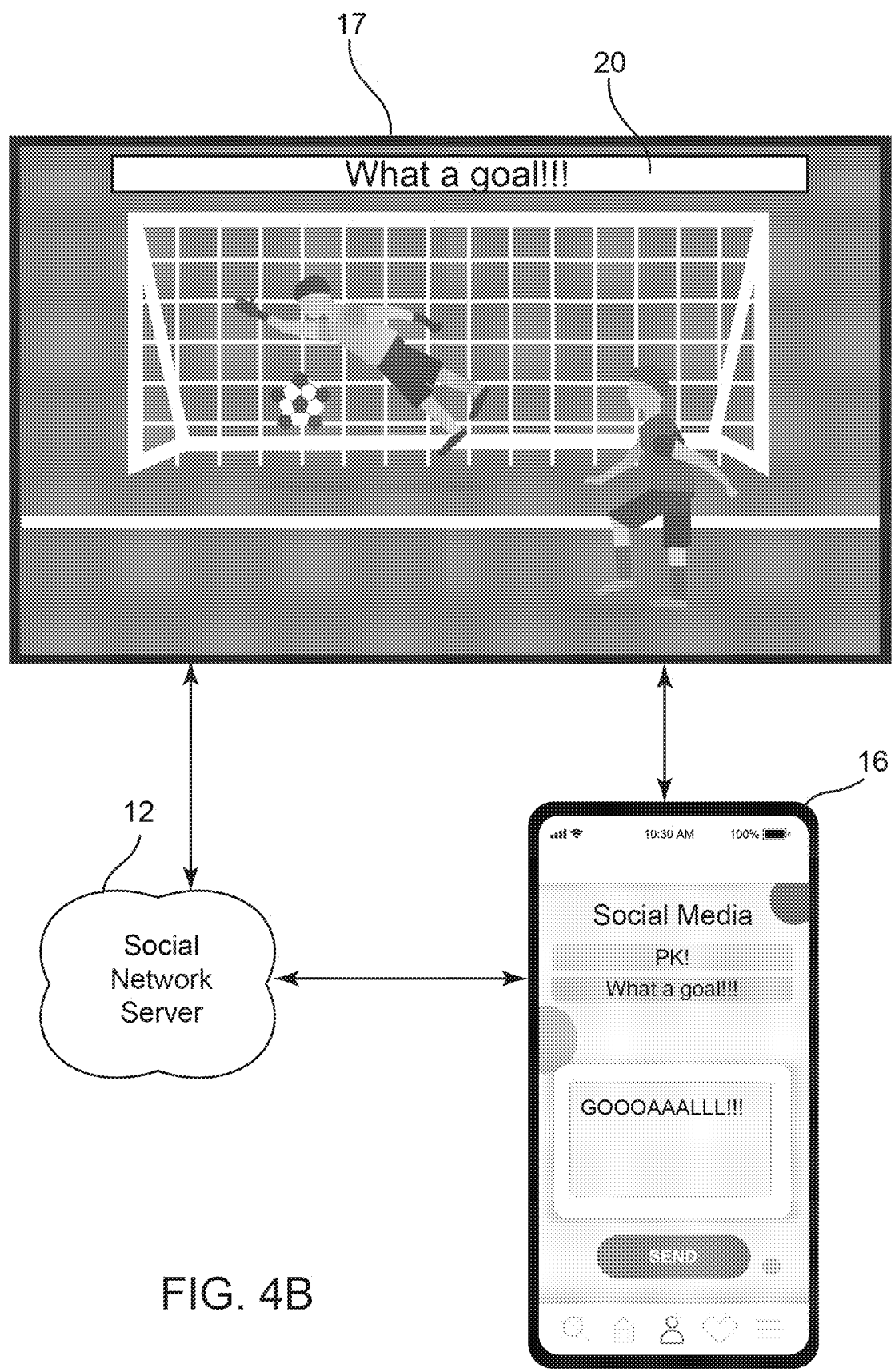
FIG. 4B is a view of a second user computing device and a second TV operating under the social media ticker system displayed in FIG. 1B according to an embodiment.
Figure 4C:
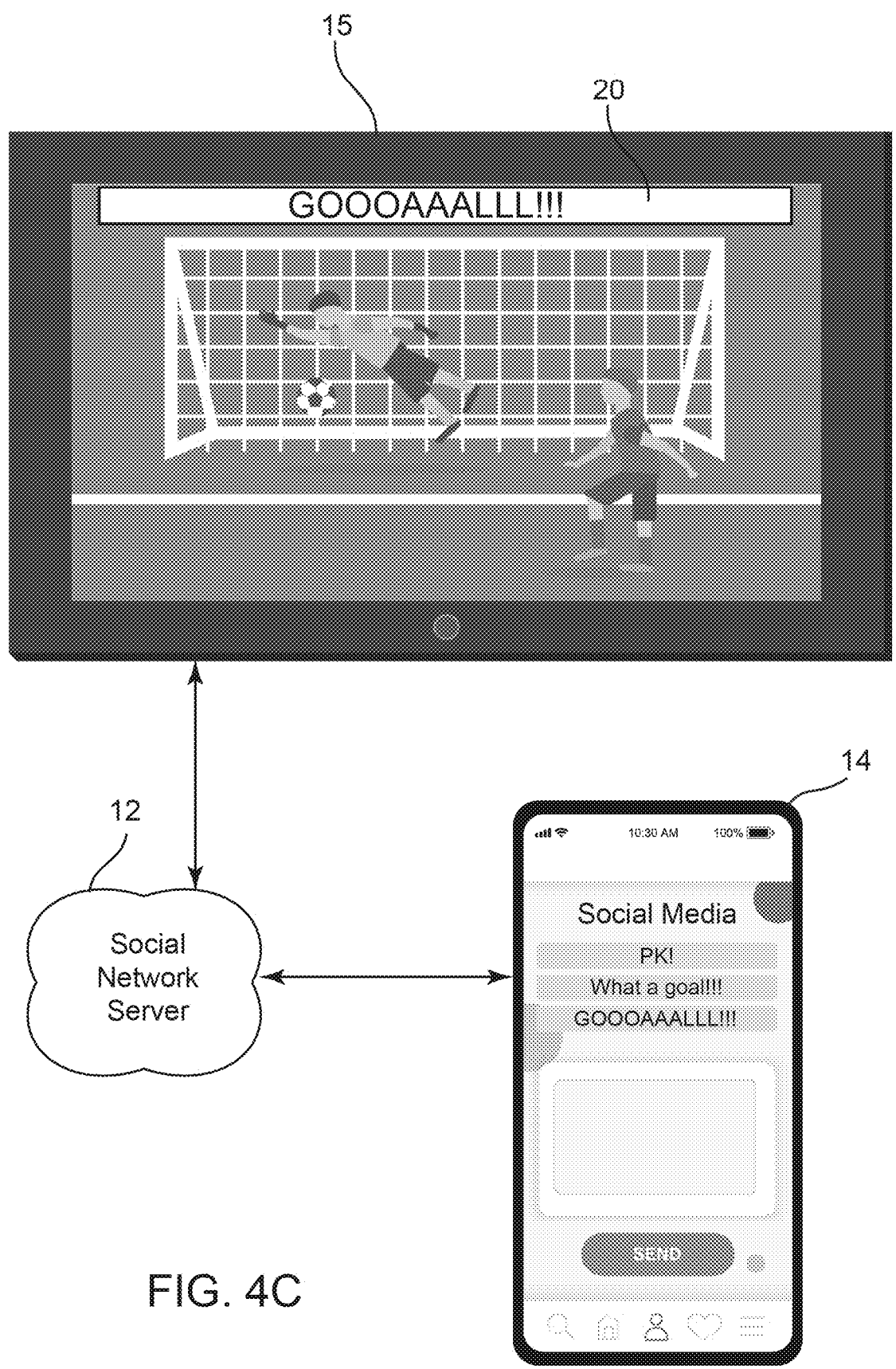
FIG. 4C is a view of a first user computing device and a first TV operating under the social media ticker system displayed in FIG. 1B according to an embodiment.
Figure 5:
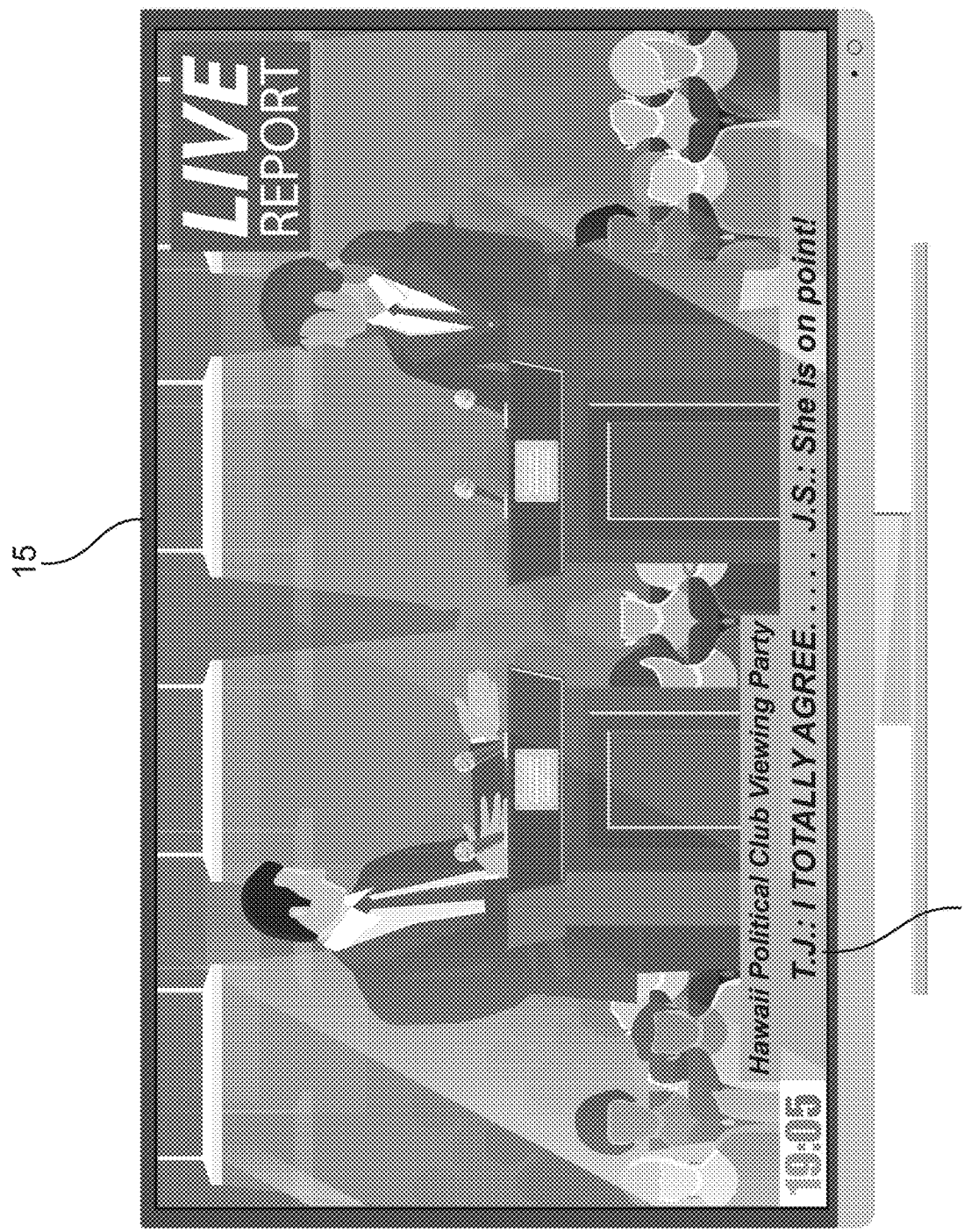
FIG. 5 depicts a TV operating a social media ticker system during a debate according to an embodiment.

Referring to FIGS. 4A-4C, the system as depicted in FIG. 1B may be employed. This embodiment depicts users that are watching a sports program, such as a soccer match. It will be understood that this can be any programming and the system 10 operates wherein the users are engaged in watching the same TV program, such as but not limited to a debate shown in FIGS. 5 and 6A-6C, a commercial shown in FIGS. 7A-7B or the like. In embodiments, the interaction of the users are a group of users that have a connection of some kind, like friends, followers and the so forth that are set to watch the same program at the same time. FIG. 4A depicts a first user computing device 14 and a first TV 16 displaying a ticker 20, wherein the first user computing device 14 is watching programming and sees the last post made in ticker 14 and is entering a post on the first user computing device 14. After the first user computing device 14 sends the post, it is displayed on the ticker 20 on all TVs of those engaged and grouped together using the system, such as, but not limited to the second TV 17 coupled to the second user computing device 16, as shown in FIG. 4B, the second user may then post a message using the second user computing device 16 that is then displayed on all TVs of those engaged and grouped together using the system, such as, but not limited to the first TV 15 coupled to the first user computing device 14, as shown in FIG. 4C. It will be understood that the posts may be displayed on the user computing devices and the TV. Further, in this embodiment, the posts are received by the user computing devices 14 and 16 are then sent to the user computing devices 14 and 16 and to the TVs 15 and 17 respectively simultaneously since all devices are coupled to an in communication with the server 12.

Figure 6A:
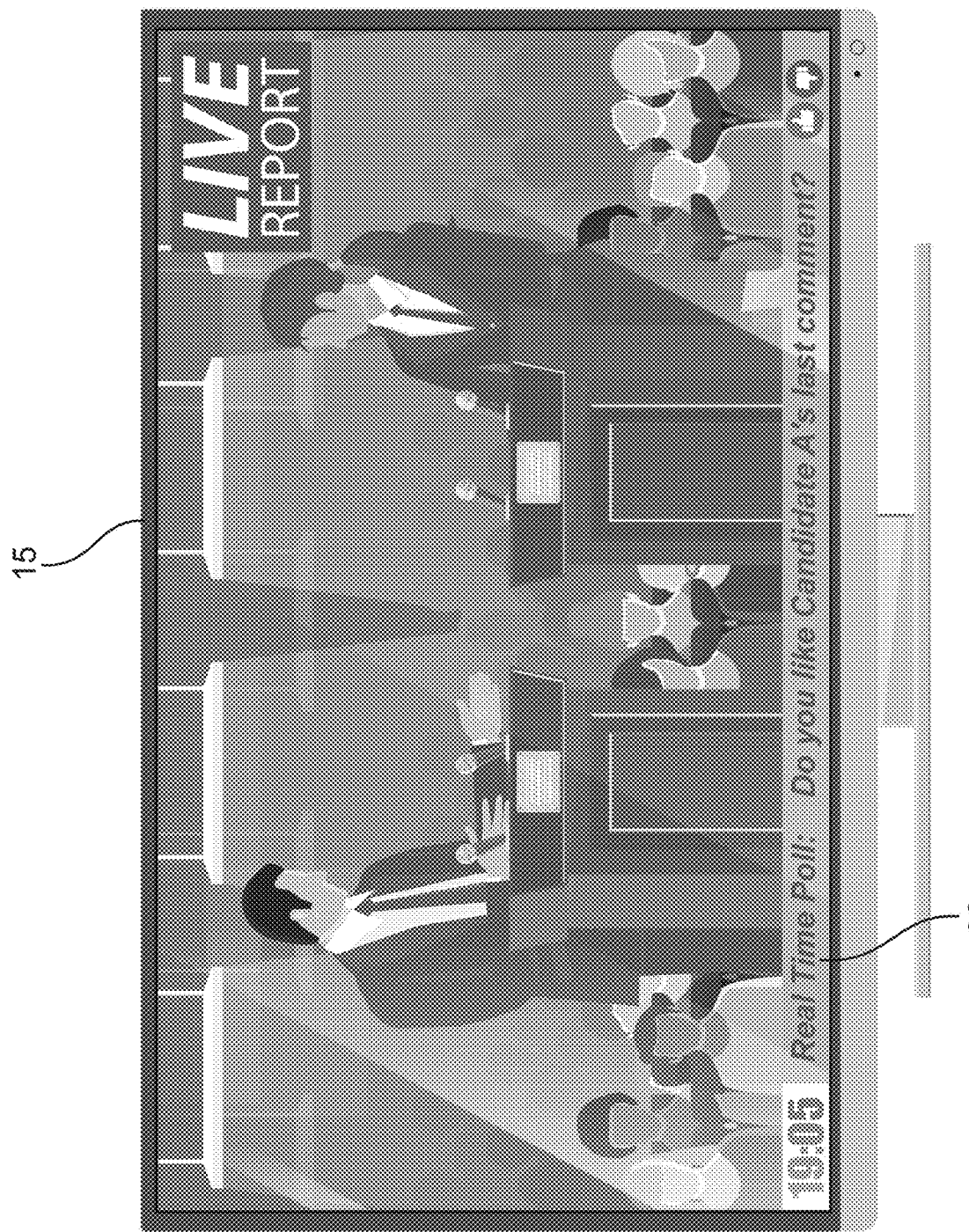
FIG. 6A depicts a social media ticker system operating to gather input regarding a program being watched on the TV according to an embodiment.
Figure 6B:
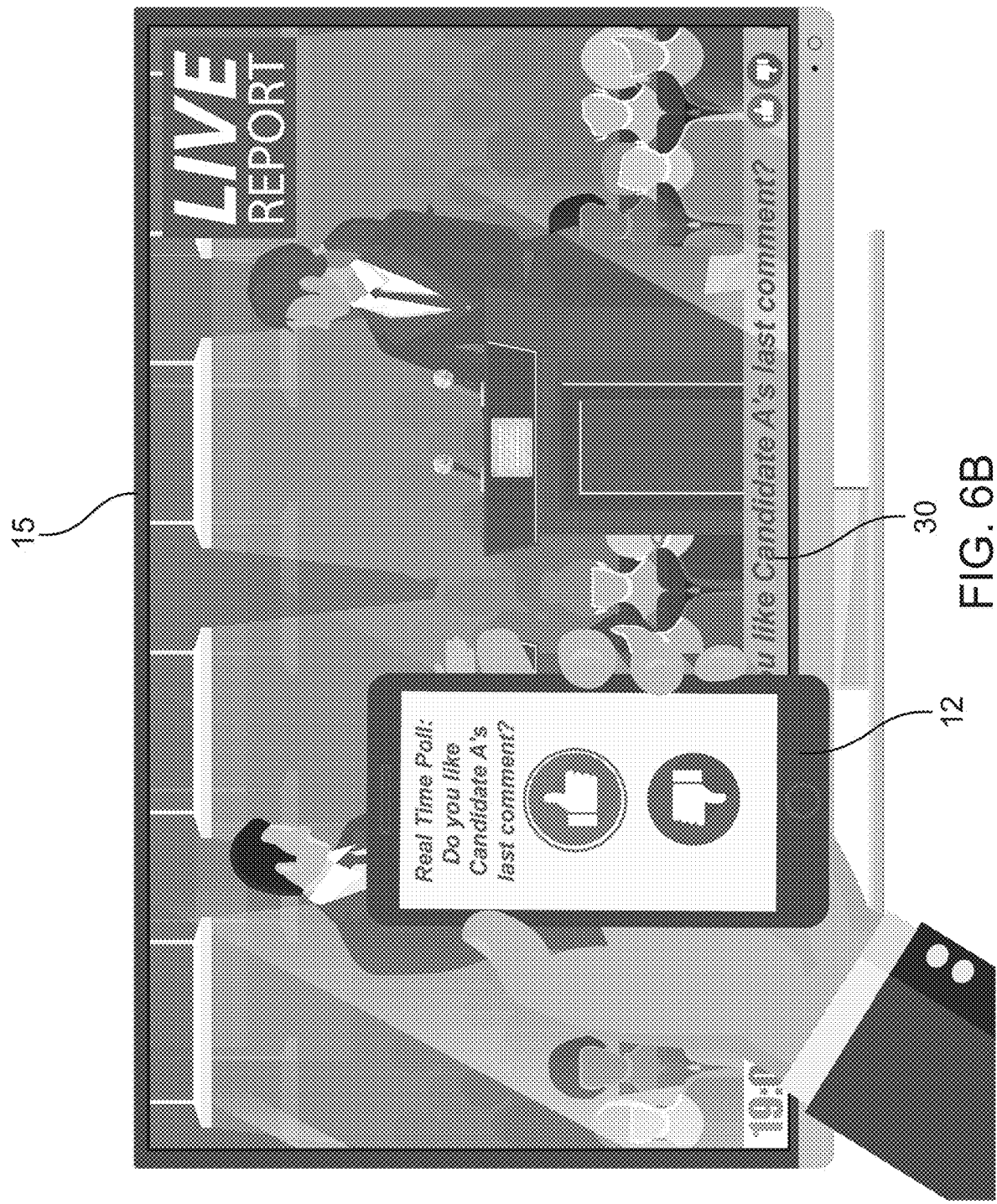
FIG. 6B depicts a social media ticker system operating to gather input regarding a program being watched on the TV according to an embodiment.
Figure 6C:
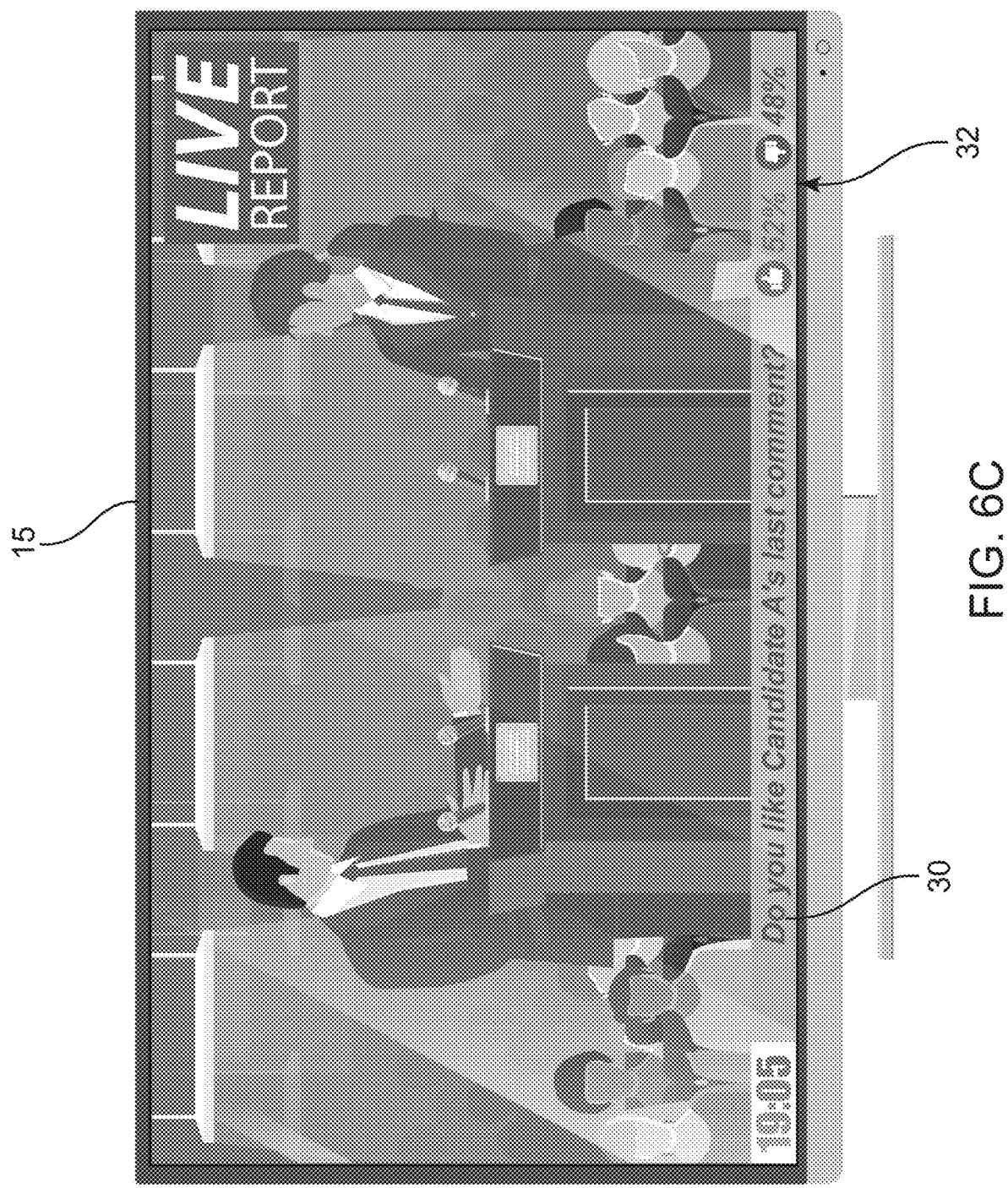
FIG. 6C depicts a social media ticker system operating to gather input regarding a program being watched on the TV according to an embodiment.

The system 10 may operate to gather anonymous poll data. FIGS. 6A-6I depict such a system. Users engaged in watching a TV program, such as a debate shown in FIGS. 6A-6I, may receive a real time poll request from the server 12. For example, FIGS. 6A-6C shows a user operating first user computing device 14 while watching a first TV 15 and is engaged in operation of the system 10 with a ticker 30 operating on the first TV 15. The server 12 may be programmed to send a poll request for display on ticker 30 to depict a poll question such as "Do you like Candidate A's last comment?" with user input options, such as a like or dislike button as shown in FIG. 6A. This poll request may be displayed in the social media platform being operated as part of the system 12 on the first user computing device 14 as shown in FIG. 6B, wherein the user can make his or her selection. After making the selection, the system 10 may include the server programmed to update the ticker 30 with percentages of inputs 32, such as percentages of input types 32 as shown in ticker 30 of FIG. 6C. This poll data may be anonymous and not tied to any particular user. This poll request can be requested and collected during a typical use of the system 10.

Figure 6D:
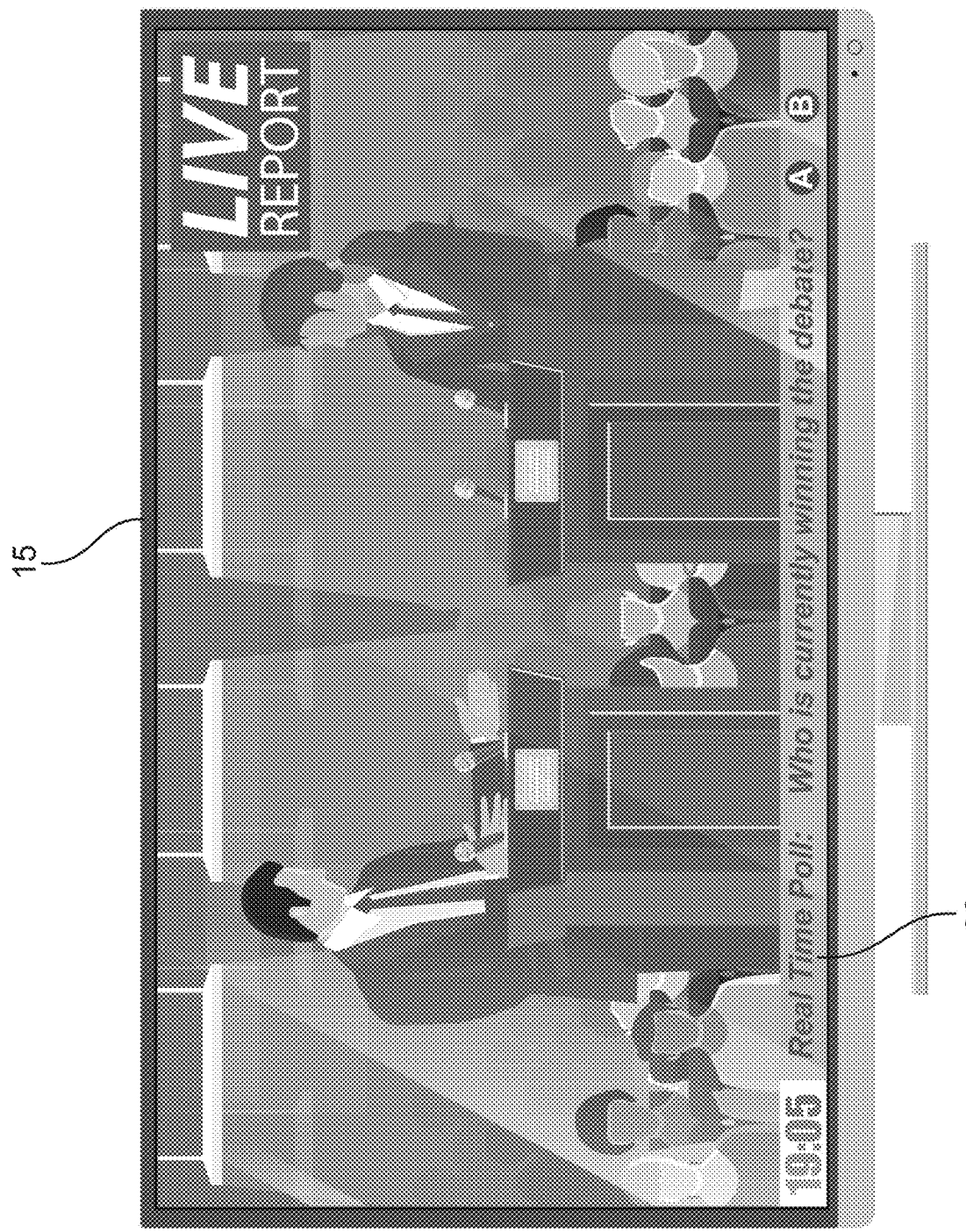
FIG. 6D depicts a social media ticker system operating to gather input regarding a program being watched on the TV according to an embodiment.
Figure 6E:
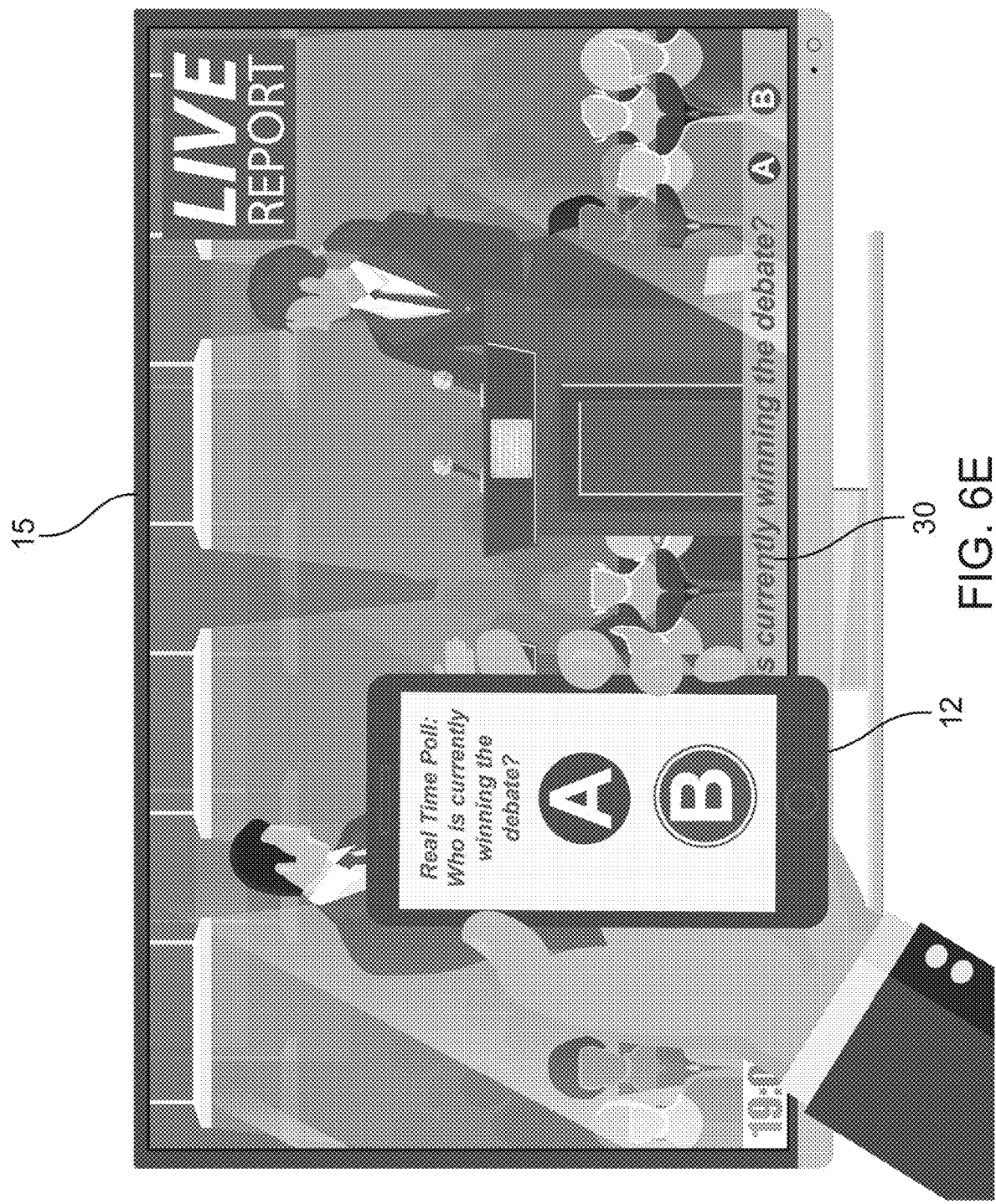
FIG. 6E depicts a social media ticker system operating to gather input regarding a program being watched on the TV according to an embodiment.
Figure 6F:
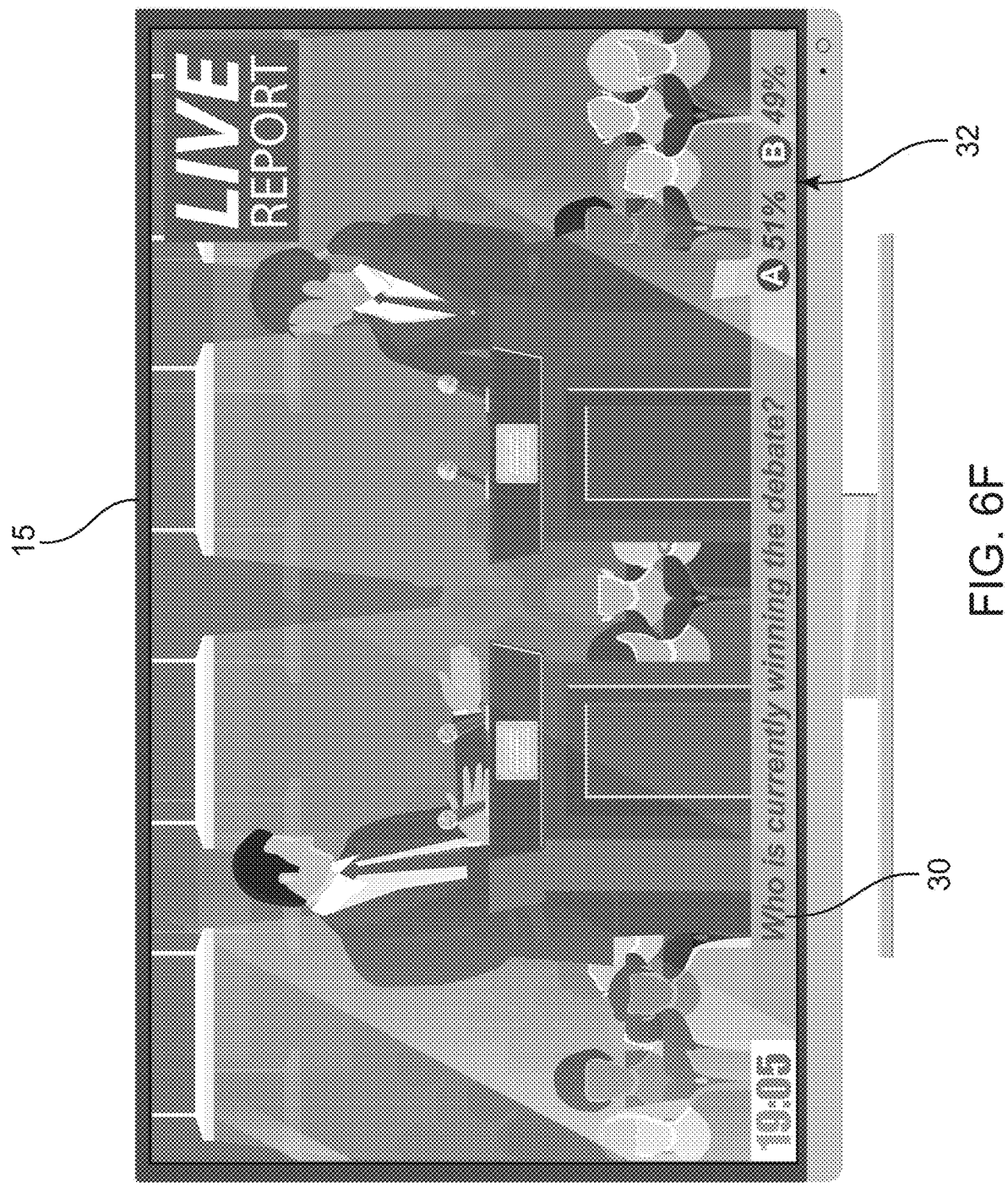
FIG. 6F depicts a social media ticker system operating to gather input regarding a program being watched on the TV according to an embodiment.

Several different real time polls may be requested throughout the program, such as the debate shown. FIGS. 6D-6I depict this aspect. For example, FIGS. 6D-6F shows a user operating first user computing device 14 while watching a first TV 15 and is engaged in operation of the system 10 with a ticker 30 operating on the first TV 15. The server 12 may be programmed to send a poll request for display on ticker 30 to depict a poll question such as "Who is currently winning the debate?" with user input options, such as an A and B button as shown in FIG. 6D. This poll request may be displayed in the social media platform being operated as part of the system 12 on the first user computing device 14 as shown in FIG. 6E, wherein the user can make his or her selection. After making the selection, the system 10 may include the server programmed to update the ticker 30 with percentages of inputs 32, such as percentages of input types 32 as shown in ticker 30 of FIG. 6F. This poll data may be anonymous and not tied to any particular user. This poll request can be requested and collected during a typical use of the system 10.

Figure 6G:
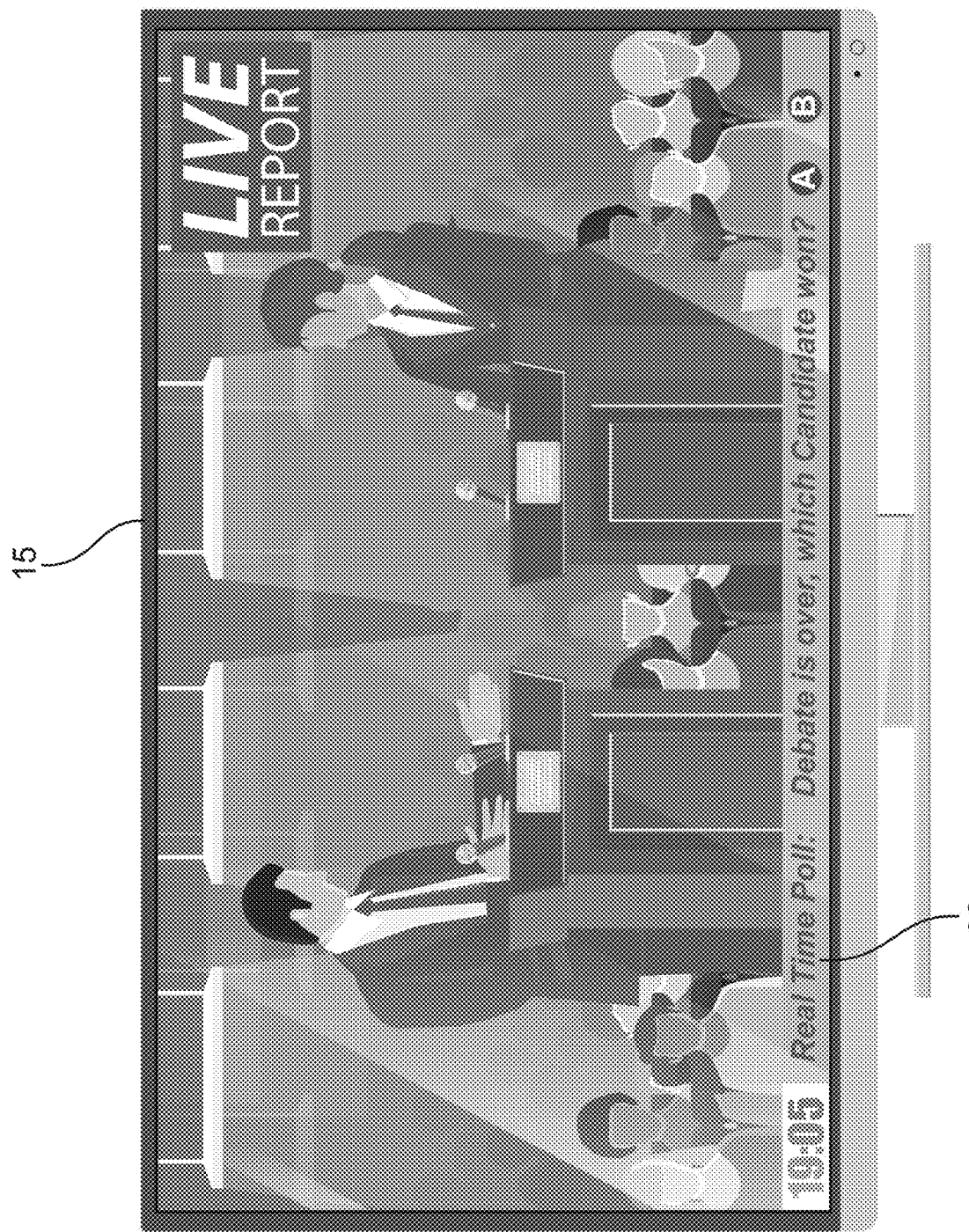
FIG. 6G depicts a social media ticker system operating to gather input regarding a program being watched on the TV according to an embodiment.
Figure 6H:
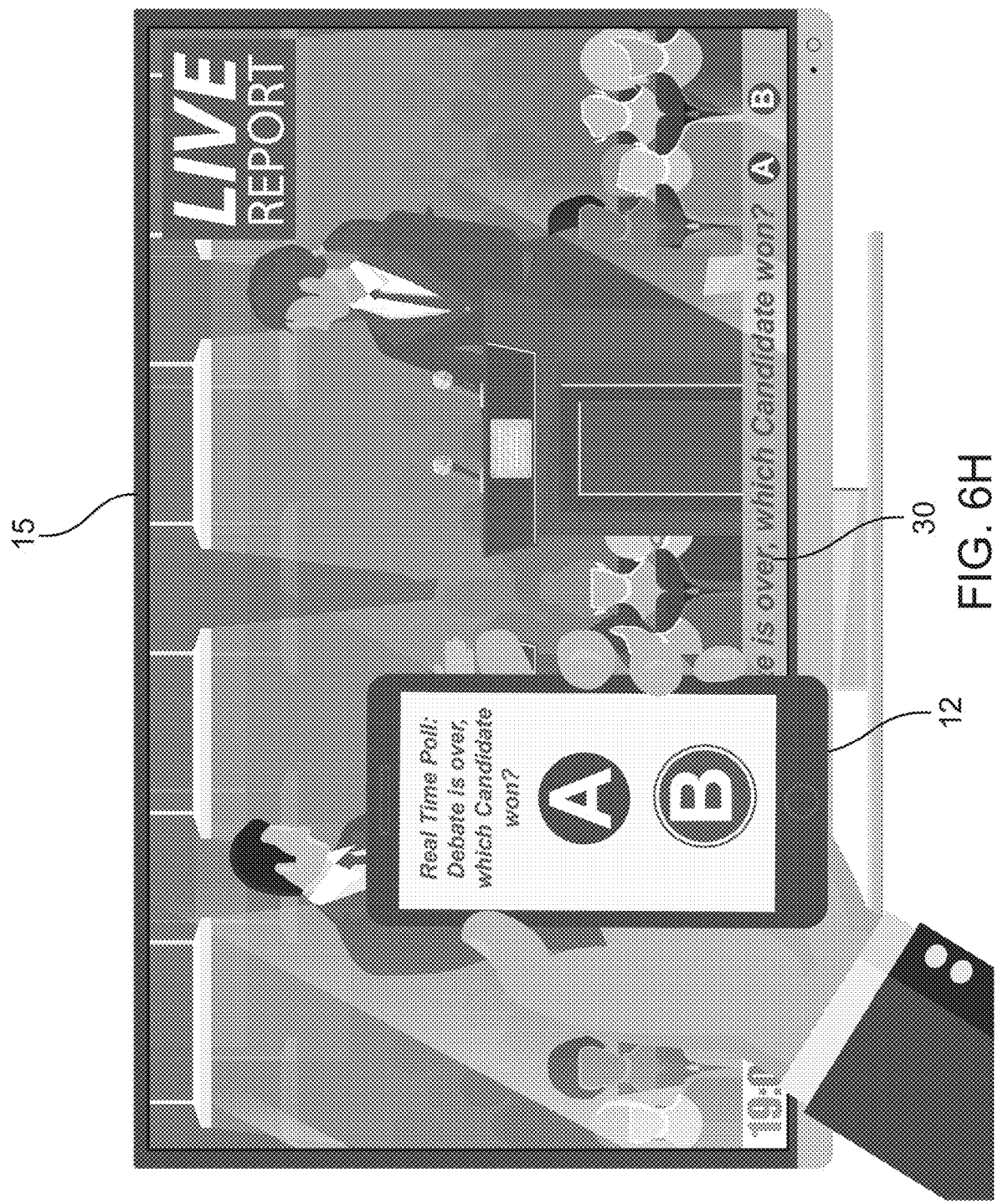
FIG. 6H depicts a social media ticker system operating to gather input regarding a program being watched on the TV according to an embodiment.
Figure 6I:
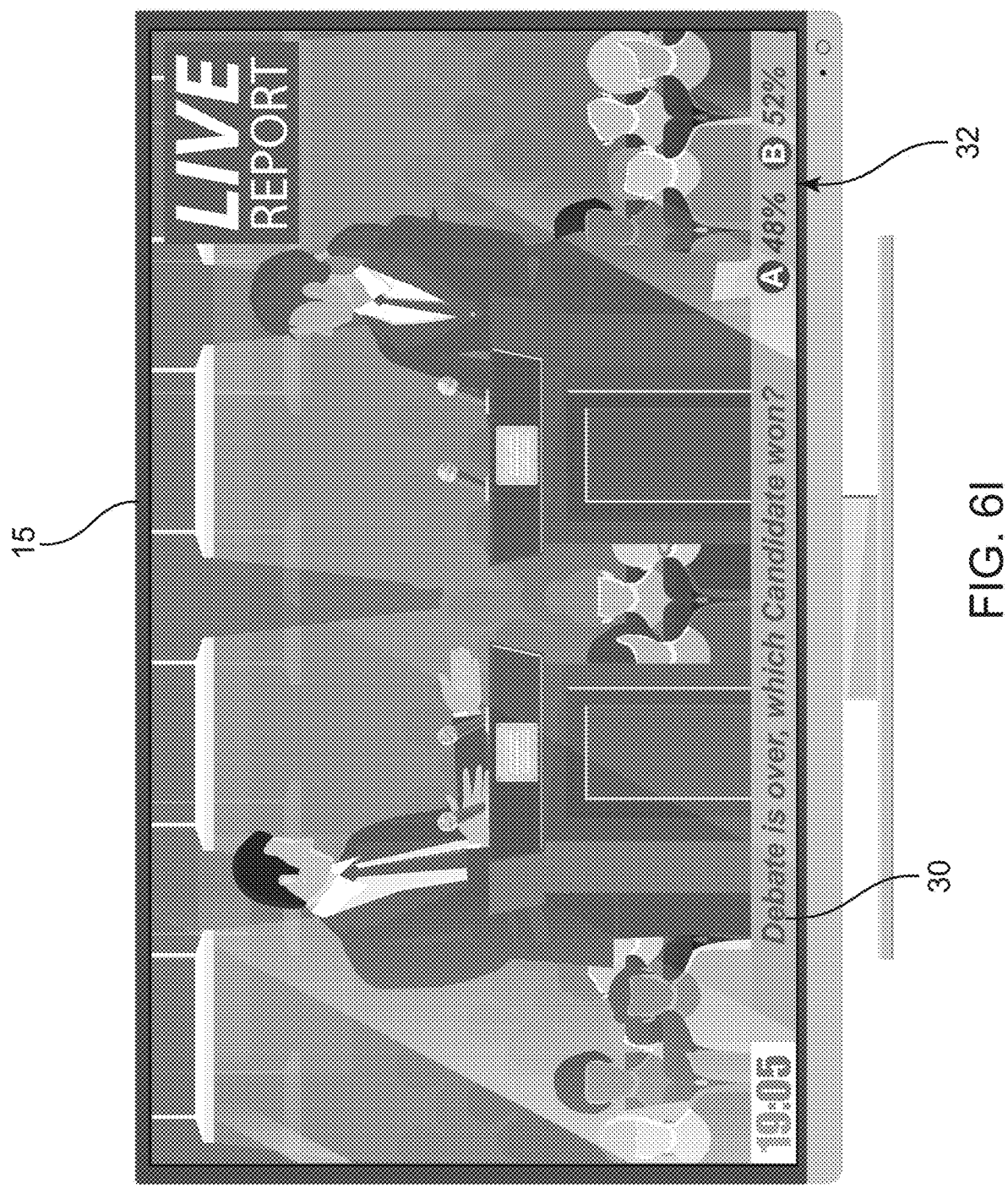
FIG. 6I depicts a social media ticker system operating to gather input regarding a program being watched on the TV according to an embodiment.

As another example, FIGS. 6G-6I shows a user operating first user computing device 14 while watching a first TV 15 and is engaged in operation of the system 10 with a ticker 30 operating on the first TV 15. The server 12 may be programmed to send a poll request for display on ticker 30 to depict a poll question such as "Debate is over, which Candidate won?" with user input options, such as an A and B button as shown in FIG. 6G. This poll request may be displayed in the social media platform being operated as part of the system 12 on the first user computing device 14 as shown in FIG. 6H, wherein the user can make his or her selection. After making the selection, the system 10 may include the server programmed to update the ticker 30 with percentages of inputs 32, such as percentages of input types 32 as shown in ticker 30 of FIG. 6I. This poll data may be anonymous and not tied to any particular user. This poll request can be requested and collected during a typical use of the system 10.

In embodiments, such as that shown in FIGS. 6A-6I, the poll data may be stored and aggregated on the server 14. The system 10 may operate to gather data that is completely anonymous regarding the user or may have varying degrees of anonymity. For example, it will be understood that engaging in the system 10 may require the anonymous collection of the geo-location of the user computing device 12 that is engaging in the system. This allows the aggregated input selections to be tied to a particular geo-location and the results can be filtered based on geo-location to, for example and without limitation, see who is engaging in the system from where, the particular geo-locations of users who reacted a certain way in polls for content being displayed on the TV and so forth. Additionally, the server may be programmed to store messages being through the system and then analyze the text through a smart system that can compare words and determine key words, trending words and so forth and store the same data analysis on the text of the messages on the server. This data may then be analyzed to determine user reaction trends. These words may also be sorted based on go-location and provide additional granularity on parts of a country, city or the like and the regional reaction to what is being broadcast on the TV as part of the system.

Figure 7A:
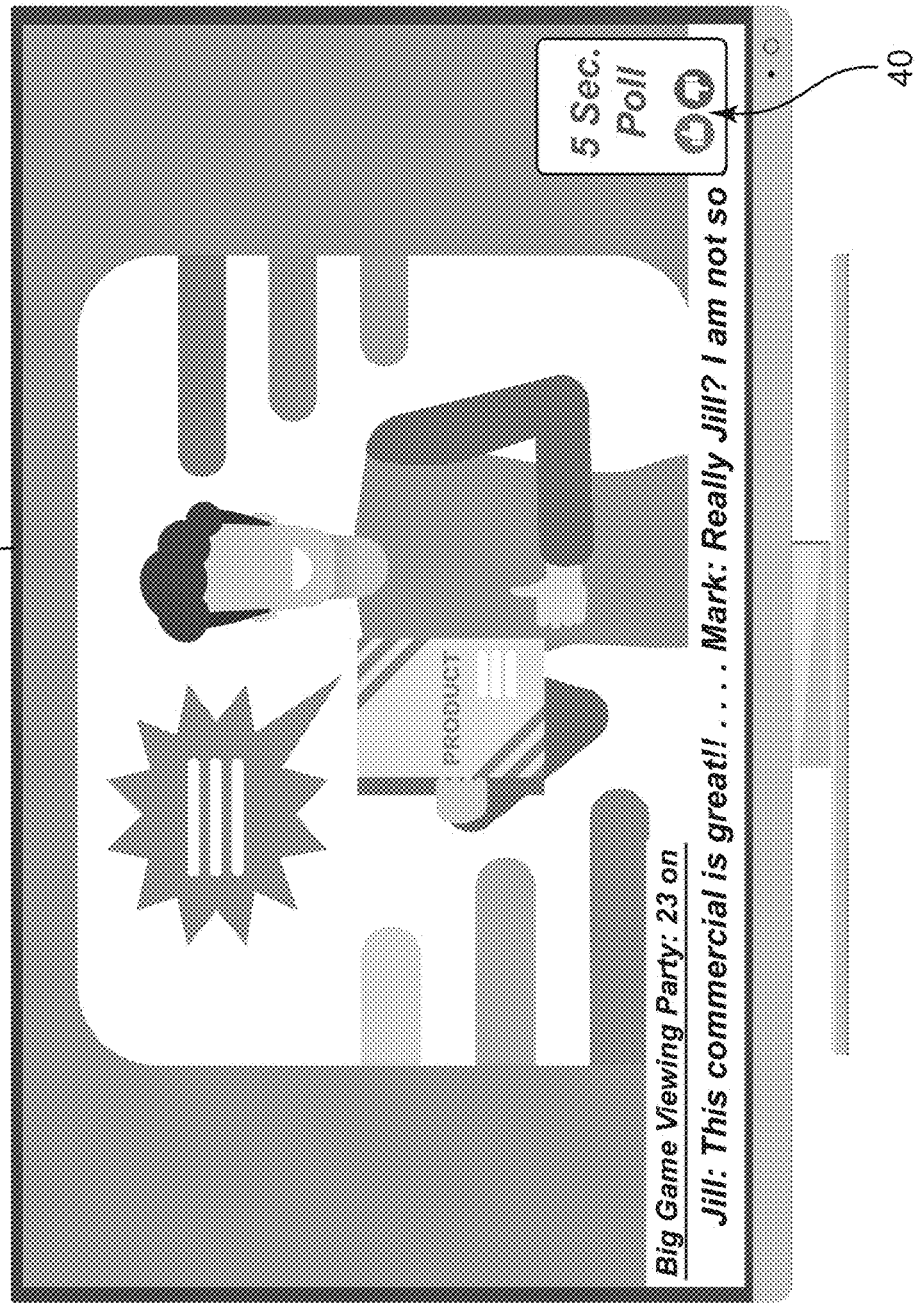
FIG. 7A depicts a social media ticker system operating in another manner to gather input regarding a commercial being watched on the TV according to an embodiment.
Figure 7B:
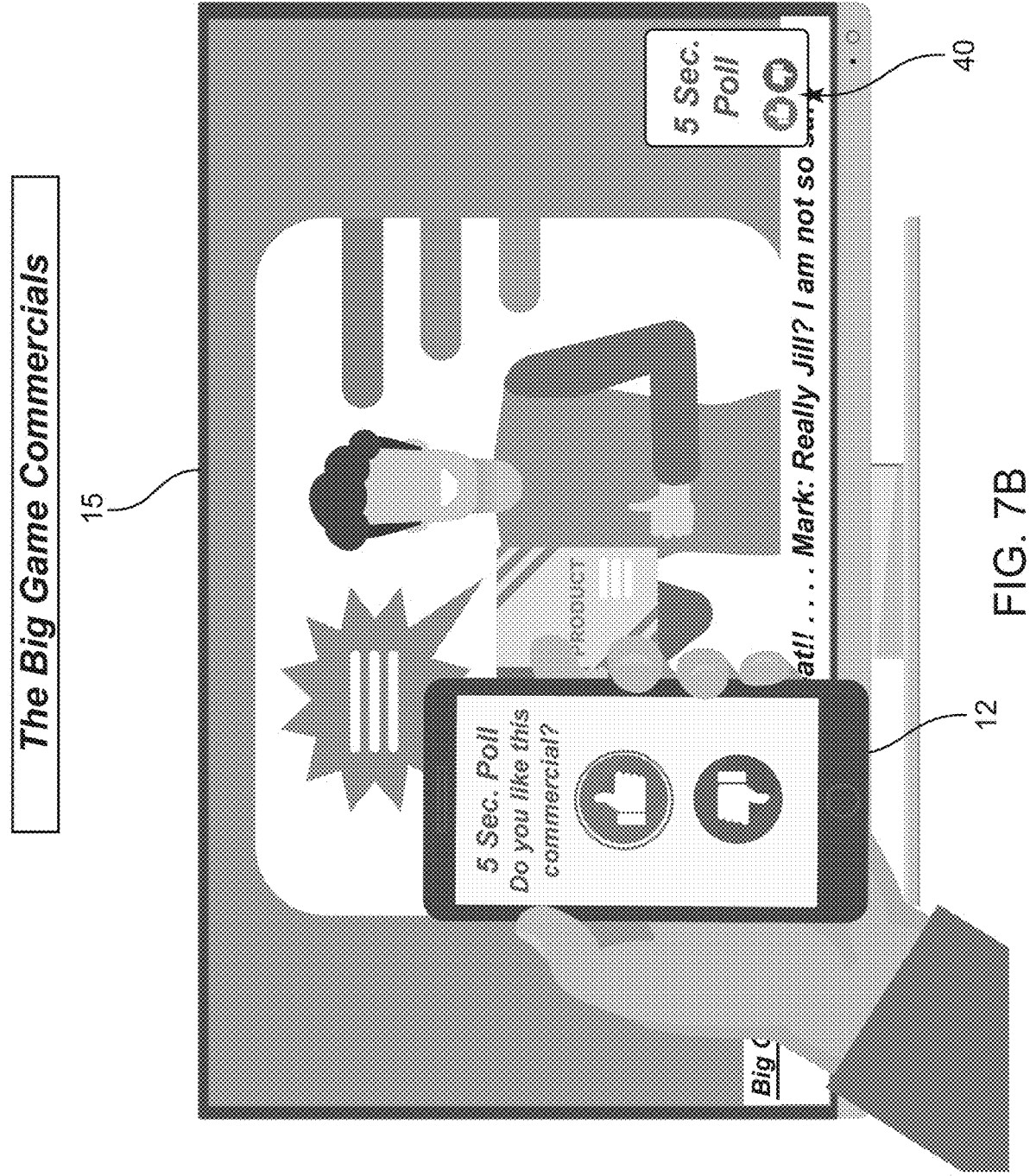
FIG. 7B depicts a social media ticker system operating in another manner to gather input regarding a commercial being watched on the TV according to an embodiment.
Figure 7C:
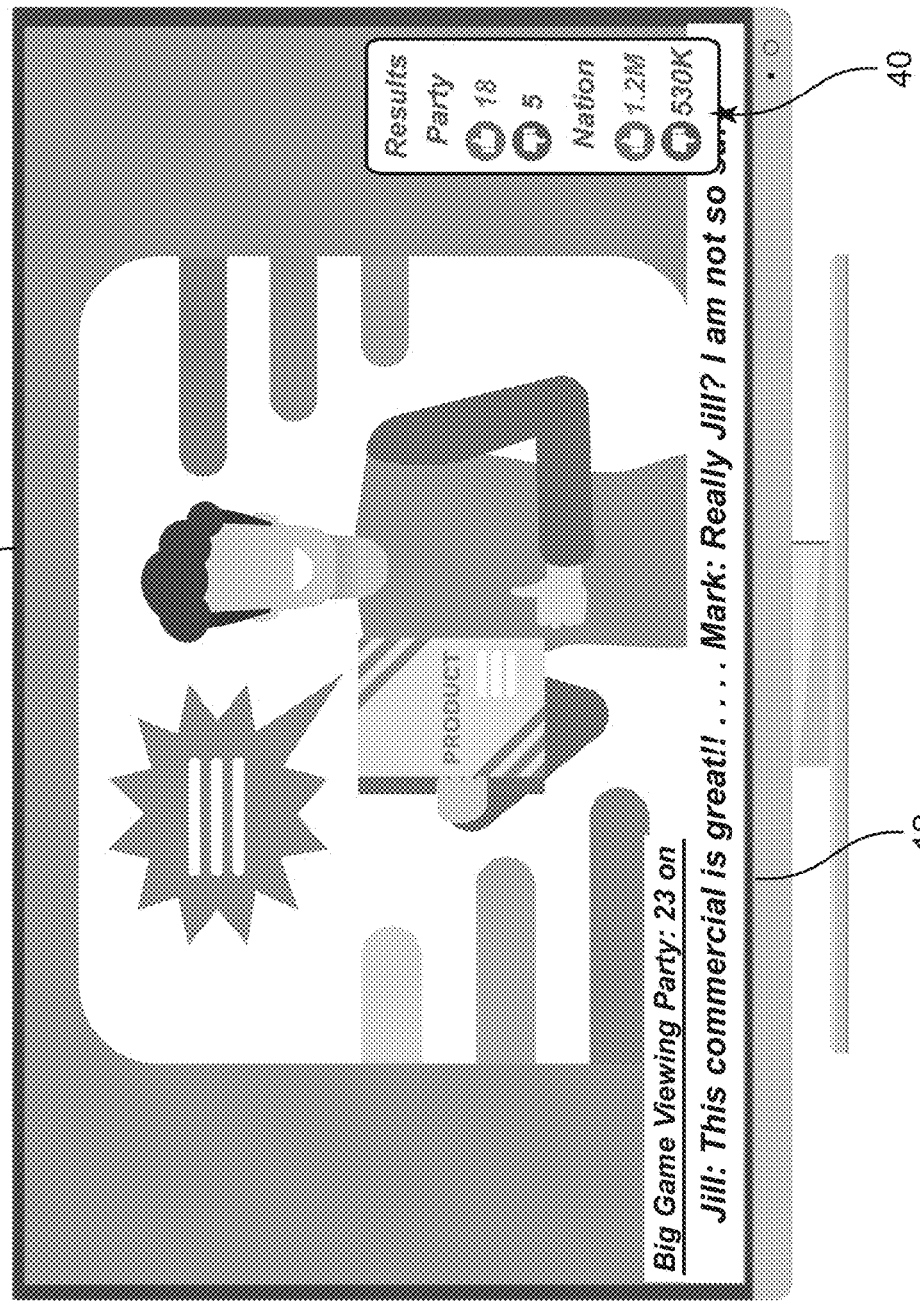
FIG. 7C depicts a social media ticker system operating in another manner to gather input regarding a commercial being watched on the TV according to an embodiment.

Another embodiment may include gathering data regarding advertisements displayed on TV while users are engaged in operating the system 10. For example, and without limitation, the system 10 may include the server 12 programmed to send a poll request to a first user and for display on ticker 40 to depict a poll question such as "Vote" with user input options, such as a like or dislike button as shown in FIG. 7A. This poll may be directly correlated to the commercial advertisement being displayed on the TV. This poll request may be displayed in the social media platform being operated as part of the system 12 on the first user computing device 14 as shown in FIG. 7B, wherein the user can make his or her selection. After making the selection, the system 10 may include the server programmed to update the ticker 30 with percentages of inputs 32, such as percentages of input types 32 as shown in ticker 30 of FIG. 7C. This poll request can be requested and collected during a typical user of the system 10.

It will be understood that the poll requests can operate for various uses and the data collected and aggregated for various uses, such as, but not limited to ratings, liking disliking advertisements, getting promotions or more information or coupons from advertisements on TV and the like. The system 10 may operate to gather data, such as what ads showed on which channel by time and send the user information, such as poll requests related to the advertisement. These advertisements can add another revenue stream for streaming TV or movie services wherein the advertisements being displayed are regular programmed ads that get valuable feedback and engagement from actual viewers. In these embodiments, users will have their text stream/ticker interrupted for a few seconds to engage with system for ad poll requests. The system may also collect data for other things such as rating political debates, award shows, TV productions and the like.

Figure 8A:
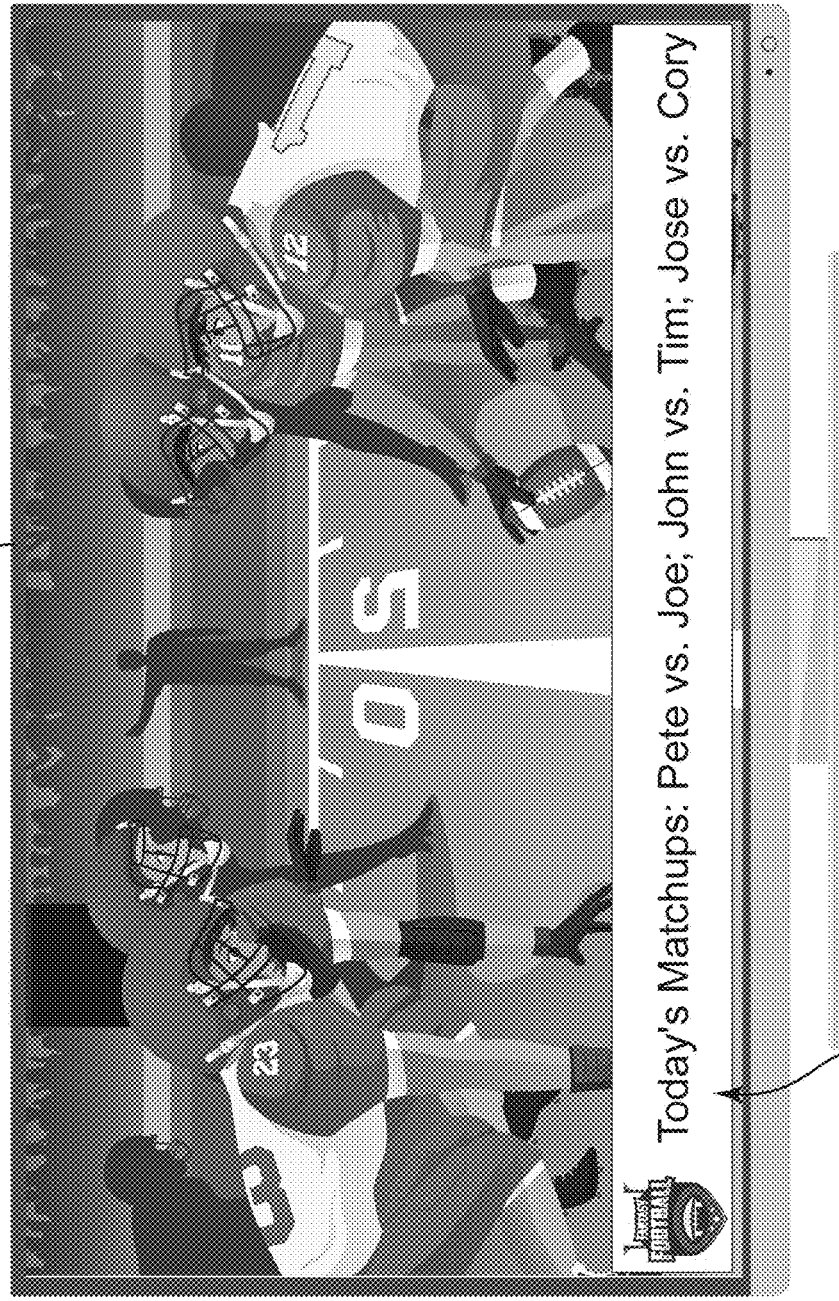
FIG. 8A depicts a social media ticker system operating with a fantasy sports system while watching a game on the TV according to an embodiment.
Figure 8B:
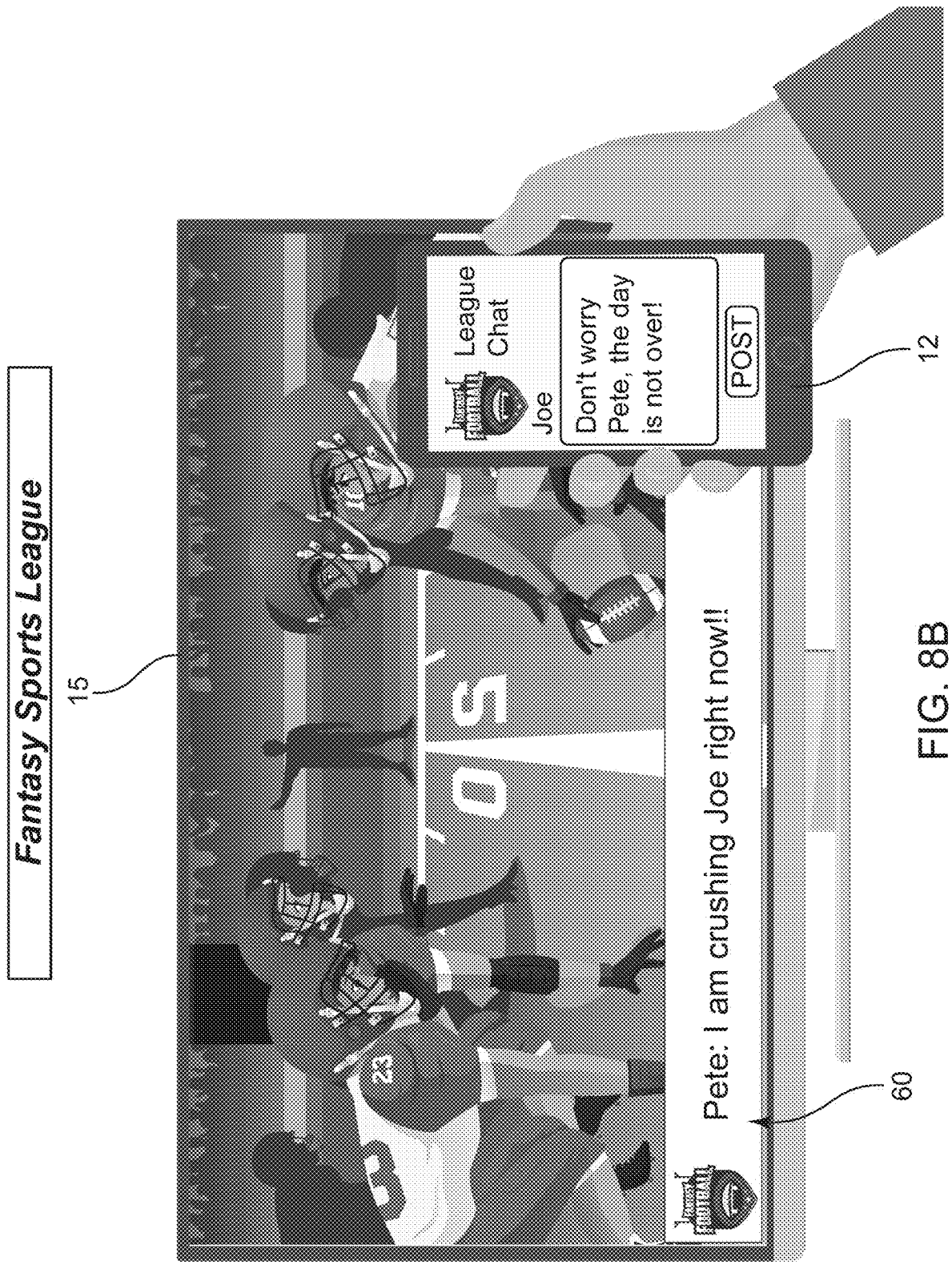
FIG. 8B depicts a social media ticker system operating with a fantasy sports system while watching a game on the TV according to an embodiment.
Figure 8C:
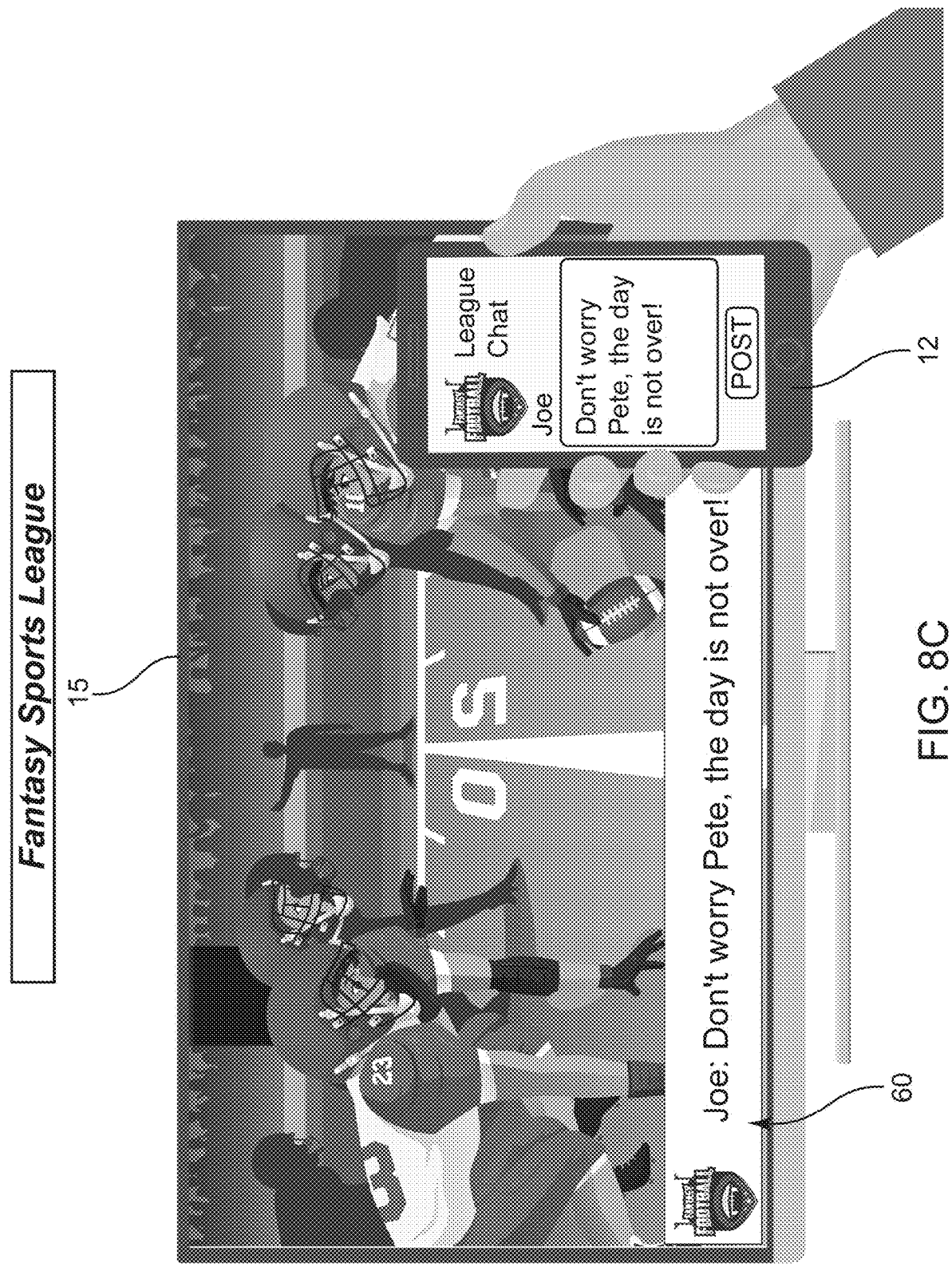
FIG. 8C depicts a social media ticker system operating with a fantasy sports system while watching a game on the TV according to an embodiment.

Referring to FIGS. 8A-8E, embodiments of the system 10 may operate as part of a fantasy sports system. Users engaged in a fantasy sport league may be watching a game on a TV, or may be able to change between games on the TV, such as a fantasy football league as shown in FIGS. 8A-8E. Users may be a part of a fantasy league and the system 10 may operate to connect all members of the league through the system. This can be a standalone system or built into an existing system or overlay an existing system, and may operate in one of the ways as described with regard to FIGS. 1A, 1B or the like. As shown in FIG. 8A, the system 10 may operate to display on a TV 16 that is tuned into watch a sporting event that relates to the fantasy league. In FIG. 8A the sports league is fantasy football and the game displayed is a football game. A ticker 60 may be displayed on the TV 16. The system 10 operates to display information from the league system and further to display interaction between users that are members of the league. FIG. 8A depicts an instance when ticker 60 is displaying information for the fantasy league system, wherein in this example, the ticker 60 is displaying the matchups between users for the week. The system 10 further operates to allow users to engage in communication that is then pushed or displayed on the TV 16. FIG. 8B displays a message from a user on the ticker 60 related to the fantasy league or a matchup or the like. The user computing devic2 12 may be operated by a user to respond to the displayed post or otherwise send a message to be viewed by all in the fantasy league, as shown in FIG. 8B. The system 10 operates to then display the message entered by the user utilizing user computing device 12, as shown in FIG. 8C, in response to select a button to initiate the post, such as selecting the "post" button shown on user computing device 12 in FIG. 8C.

Figure 8D:
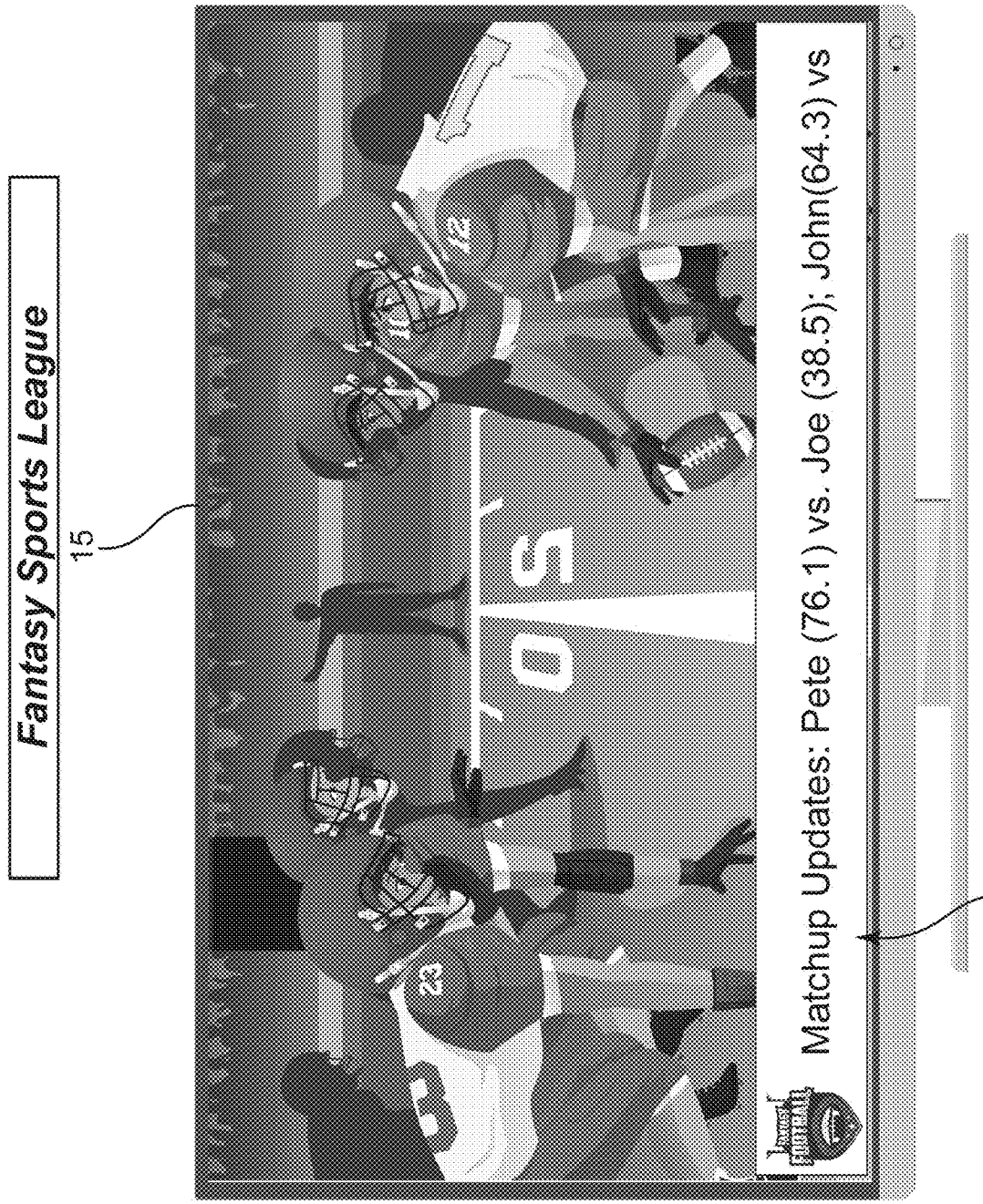
FIG. 8D depicts a social media ticker system operating with a fantasy sports system while watching a game on the TV according to an embodiment.

The system 10 operates to display posts by all users of the system in the fantasy sports league. This allows the users in the league to interact while watching the game or games that are of interest to them. In this way they can engage in banter, communication and the like while also not having to turn away from the game displayed on the TV 16. It will be understood that the system 10 operates with more than one TV and more than one user computing device and may be at the same number of locations as there are members of the league or may be on less TVs where multiple users at a single location can still interact with the system. At intermittent times, as determined by the system 10 or at a preference set by the users, the system 10 may provide periodic fantasy league information, as shown in FIG. 8D, such as a update on scores for various matchups (FIG. 8D), changes in score, final results of the game, top performers stats, and the like.

Figure 8E:
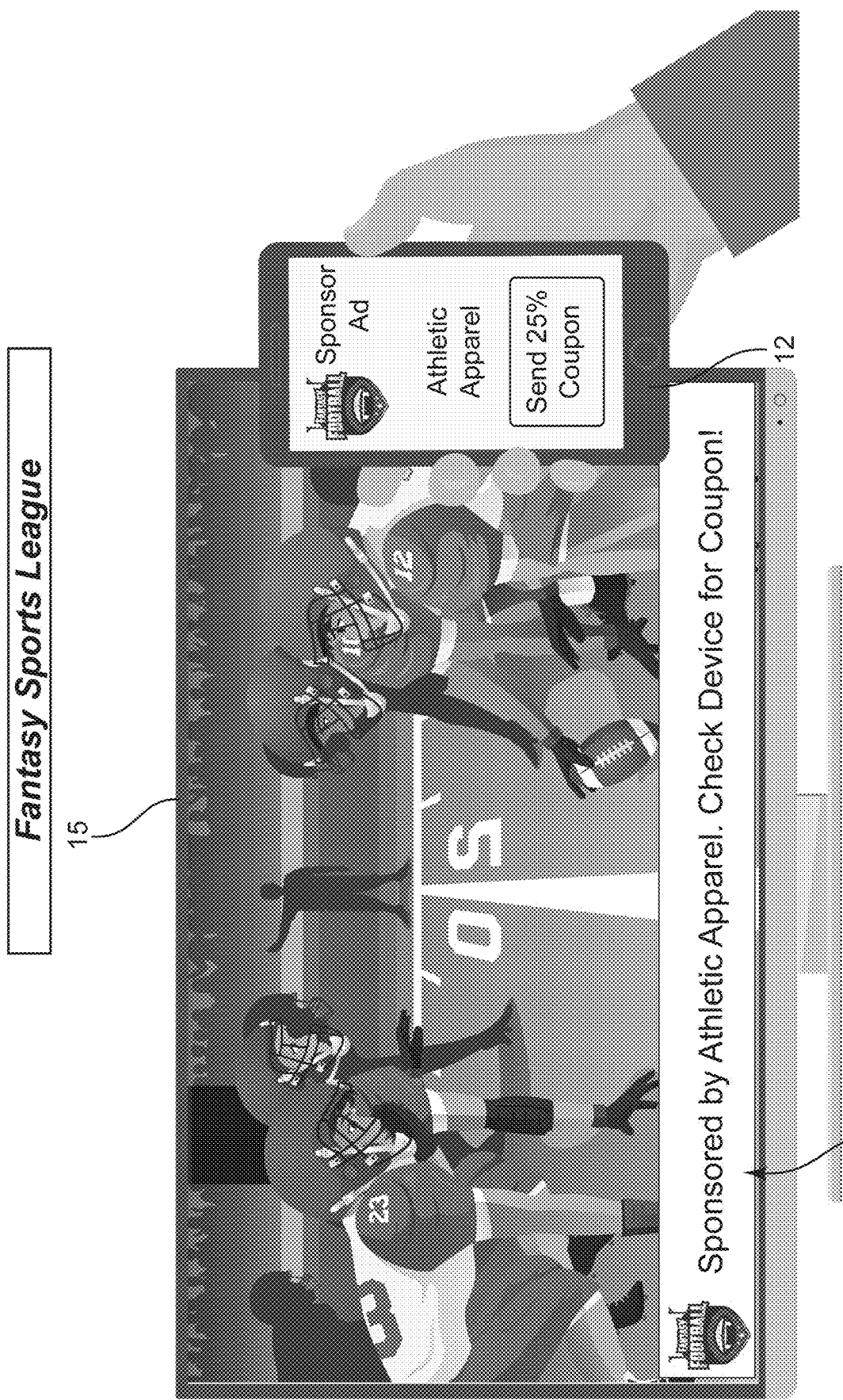
FIG. 8E depicts a social media ticker system operating with a fantasy sports system while watching a game on the TV according to an embodiment.

Further, there system 10, as shown in FIG. 8E may operate to incorporate advertisements. As shown in FIG. 8E, the fantasy league system may have sponsors or other companies that pay for advertisement on the system 10. The system may operate to display an add on the ticker 60, such as advertisement 70 for a company. The advertisement may include instruction on how to obtain a discount (shown in FIG. 8E), obtain information on products/services offered, purchase goods, and the like. This may include providing a concurrent advertisement for the company on the user computing device 12, as shown in FIG. 8E. This may be a discount and may include in a button to obtain the advertised benefit or engage with what the advertisement is offering, such as the discount being displayed on the user computing device 12. The system 10 may then proceed back to the typical engagement with the ticker 60 as previously discussed.

With regard to all of these embodiments, it will be understood that engaging in the system 10 may require the anonymous collection of the geo-location of the user computing device 12 that is engaging in the system. This allows the aggregated input selections to be tied to a particular geo-location and the results can be filtered based on geo-location to, for example and without limitation, see who is engaging in the system from where, the particular geo-locations of users who reacted a certain way in polls for content being displayed on the TV and so forth.

Embodiments may be available on or through the internet, such as through domain names reserved and owned by Applicant that include tv-ticker.com, ticker-text.com, game-crawl.com, tapeticker.com, tvsquads.com, squadsbox.com, talkoversports.com, sports-crawl.com, textstrip.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A system for social interaction regarding features based on geolocation, the system comprising:
    a social media server having a memory storing various data;
    a first user computing device coupled to the server and a first TV; and
    a second user computing device coupled to the server and a second TV, wherein the first user computing device and the second user computing device each comprise a location device for determining the geo-location of first user computing device and the second user computing device and wherein the first and second TVs are configured to display a ticker displaying interaction between the first and second user computing devices on a social media platform engaged with a social media server while watching the same particular program on the first and second TVs respectively, wherein the social media server is programmed to:
    receive a first message sent from the first user computing device and send for display on the first TV and the second TV;
    send the first message sent from the first user computing device for display on the second user computing device;
    receive a second message from the second user computing device and send for display on the first TV and the second TV;
    send the second message sent from the second user computing device for display on the first user computing device;
    send a poll request corresponding to what is displayed on the first and second TVs for input from the first and second user computing devices, wherein input responsive to the poll request comprises a geo-location for the first user computing device and a geo-location for the second user computing device and is collected and aggregated on the social media server, wherein the poll request interrupts the ticker for a period of time to allow the first and second user computing devices to respond to the poll request;
    store messages sent through the system;
    analyze the text of the messages stored on the social media server through a smart system to compare words and determine key words and trending words and store the analysis on the text of the messages on the social media server; and analyze the key words, trending words and combinations thereof, determine user reaction trends, and sort user reaction trends based on user geo-location.

2. The system of claim 1, wherein the input responsive to the poll request is anonymous.

3. The system of claim 1, wherein the server is programmed to send current poll results for display on the first and second TVs.

4. The system of claim 1, wherein the server may be programmed to generate reports of the poll data.

5. The system of claim 4, wherein the reports may be customized based on geo-location.

* * * * *